Figure 30:
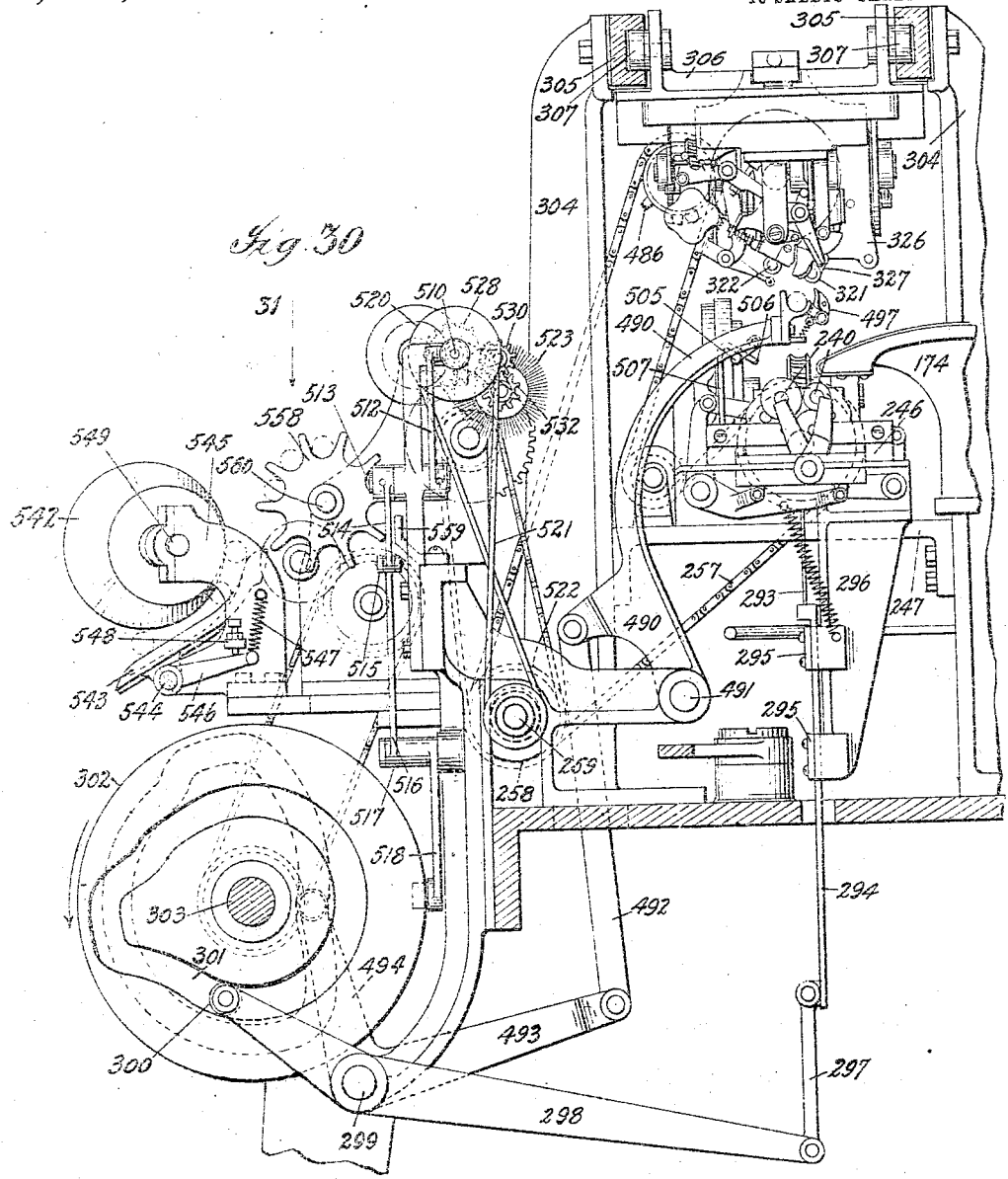

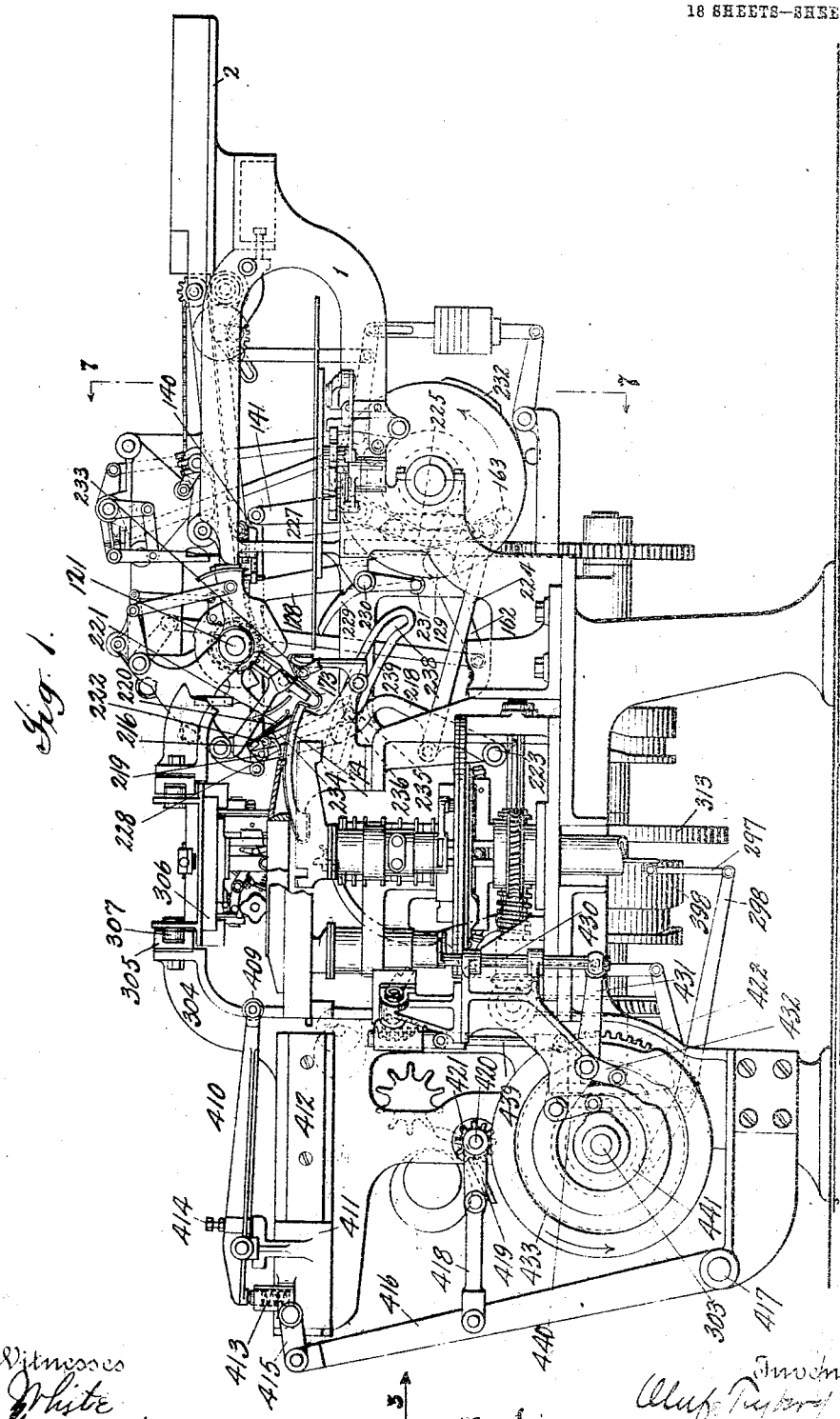

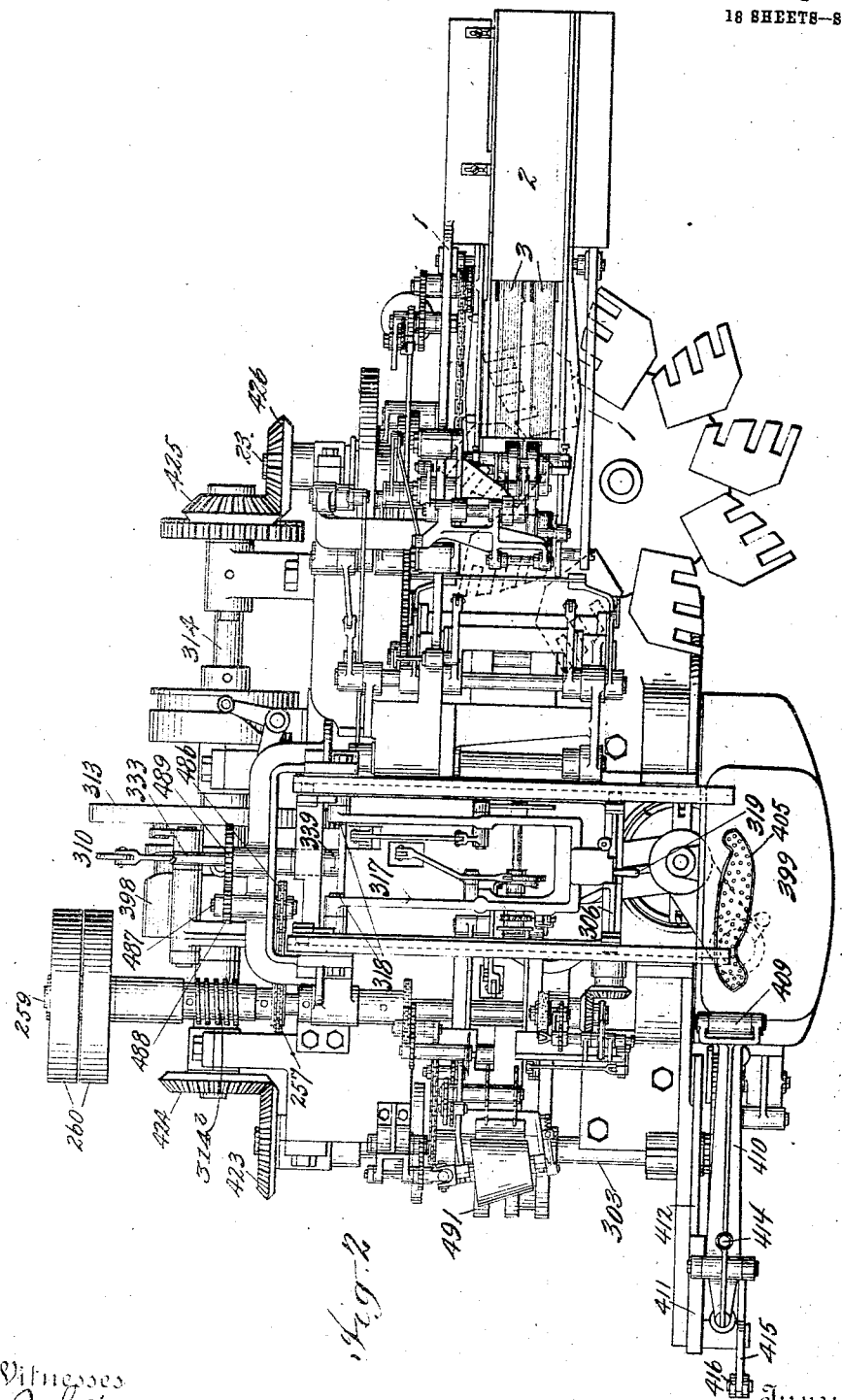

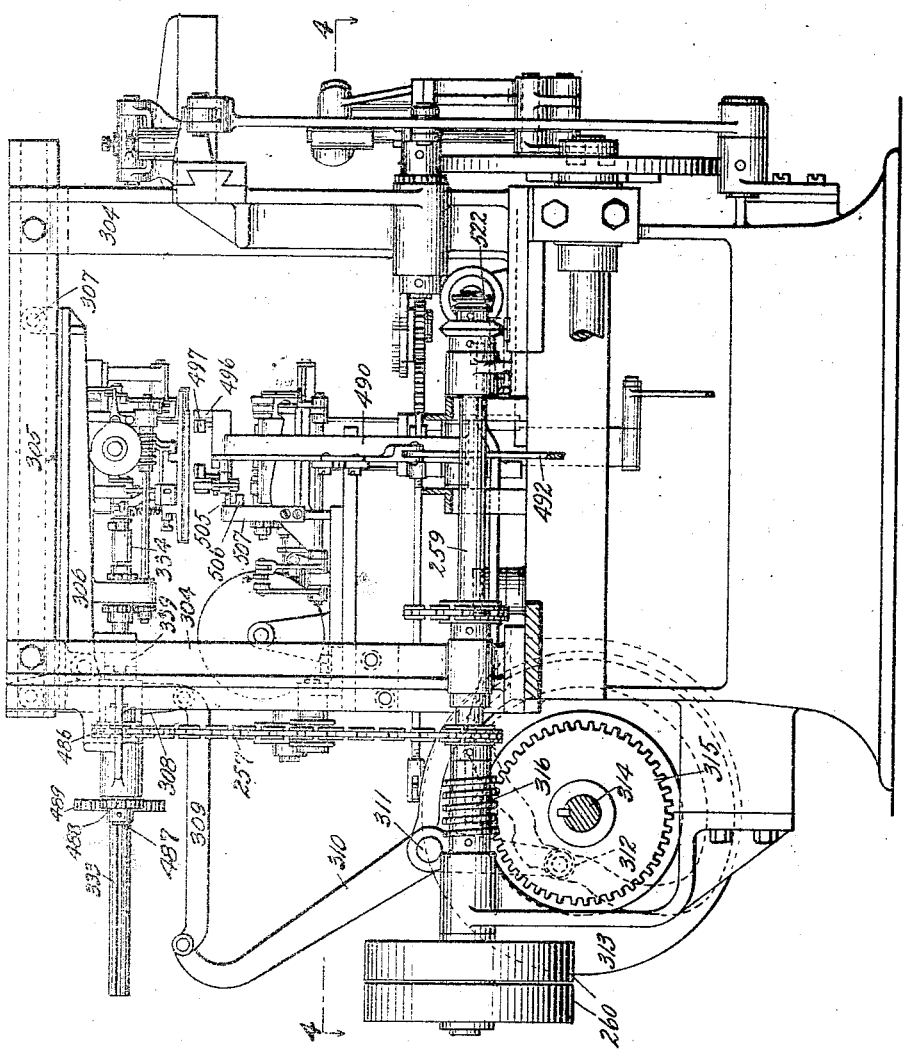

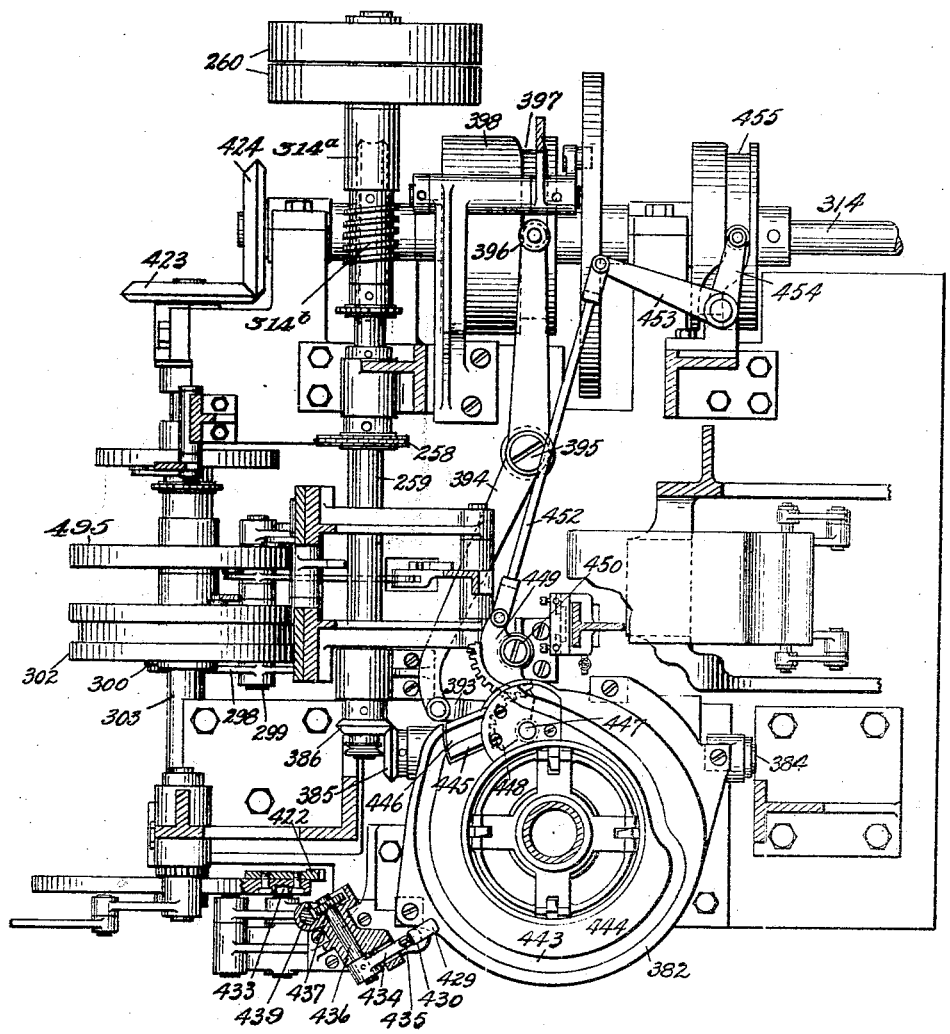

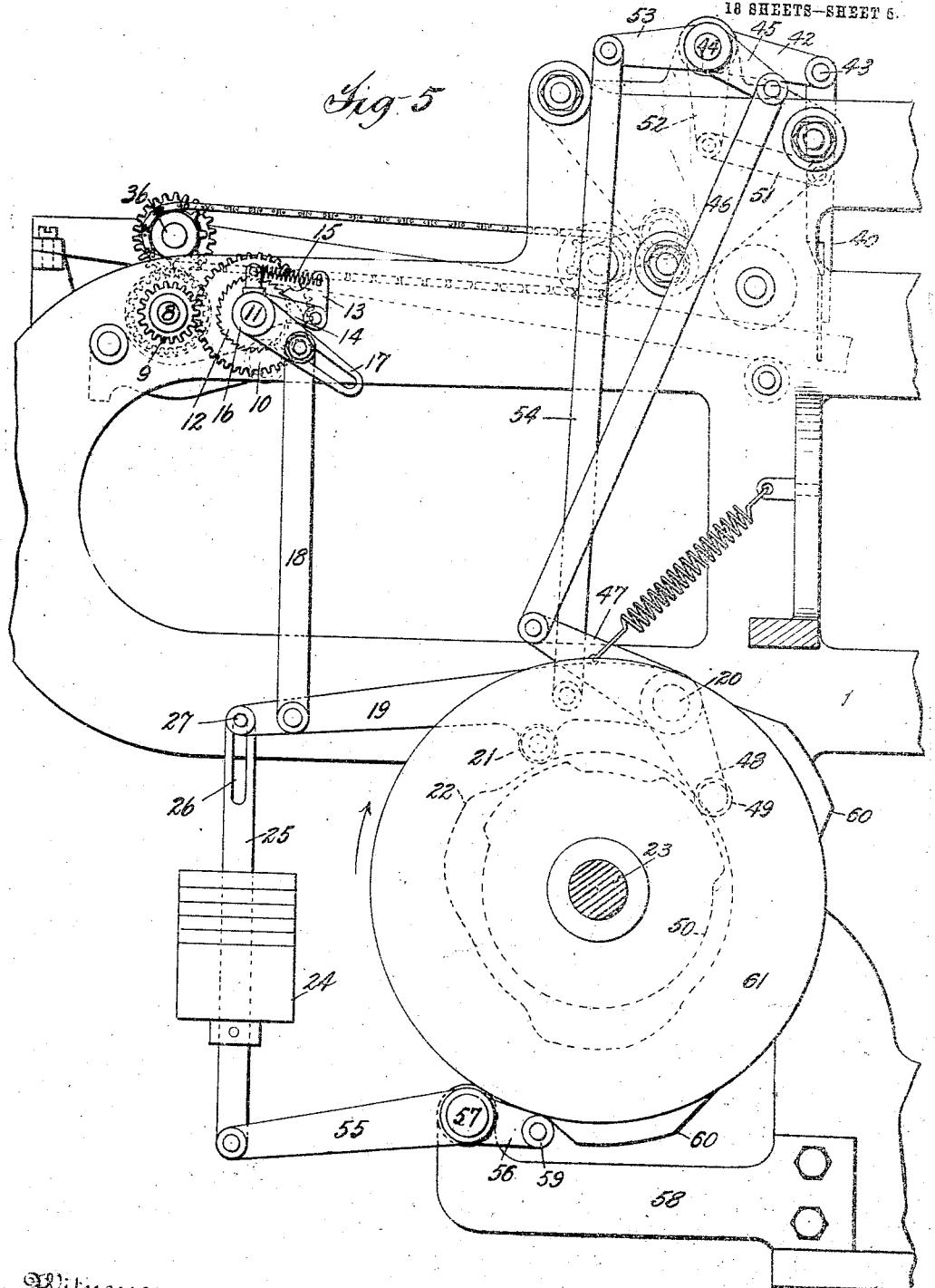

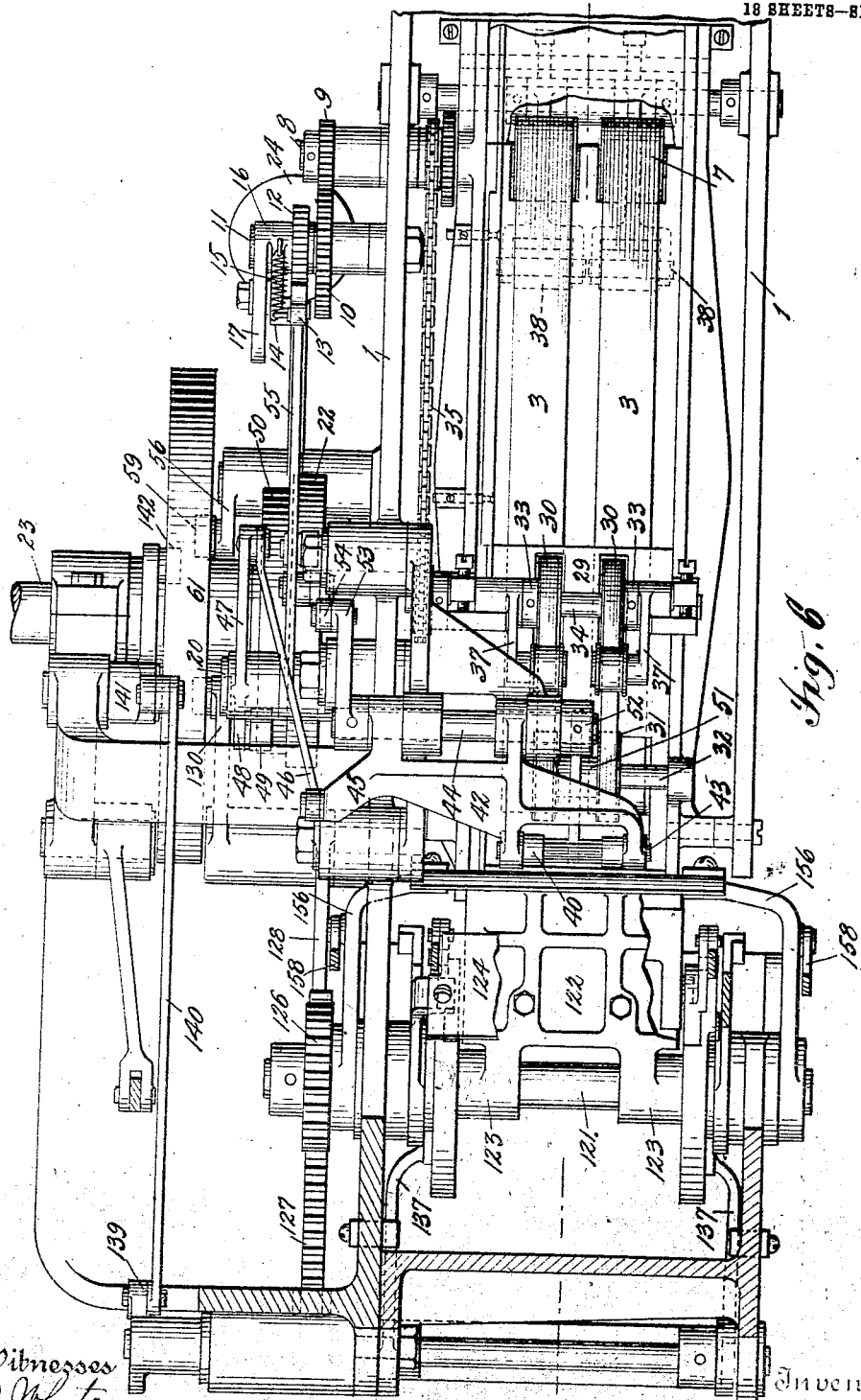

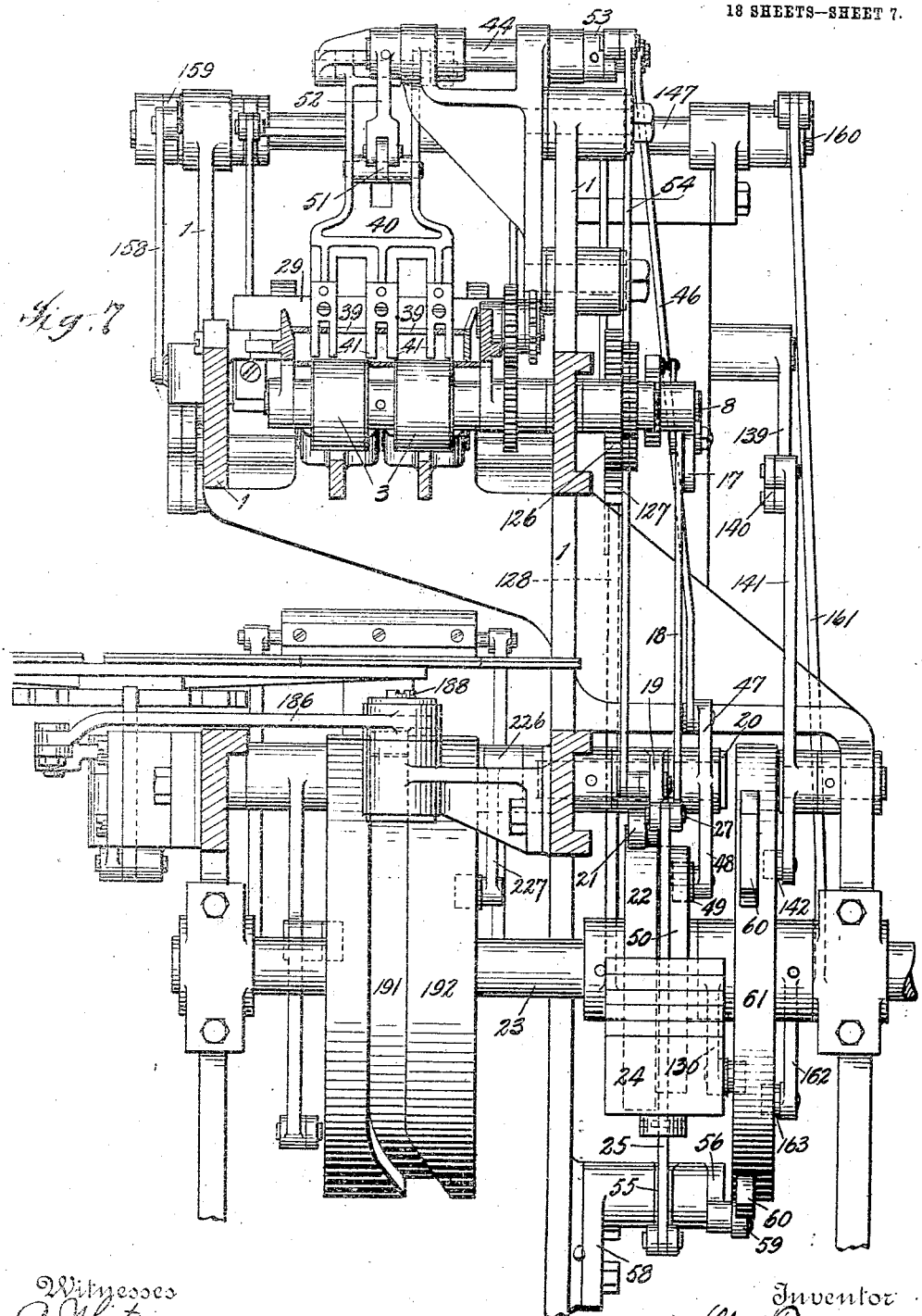

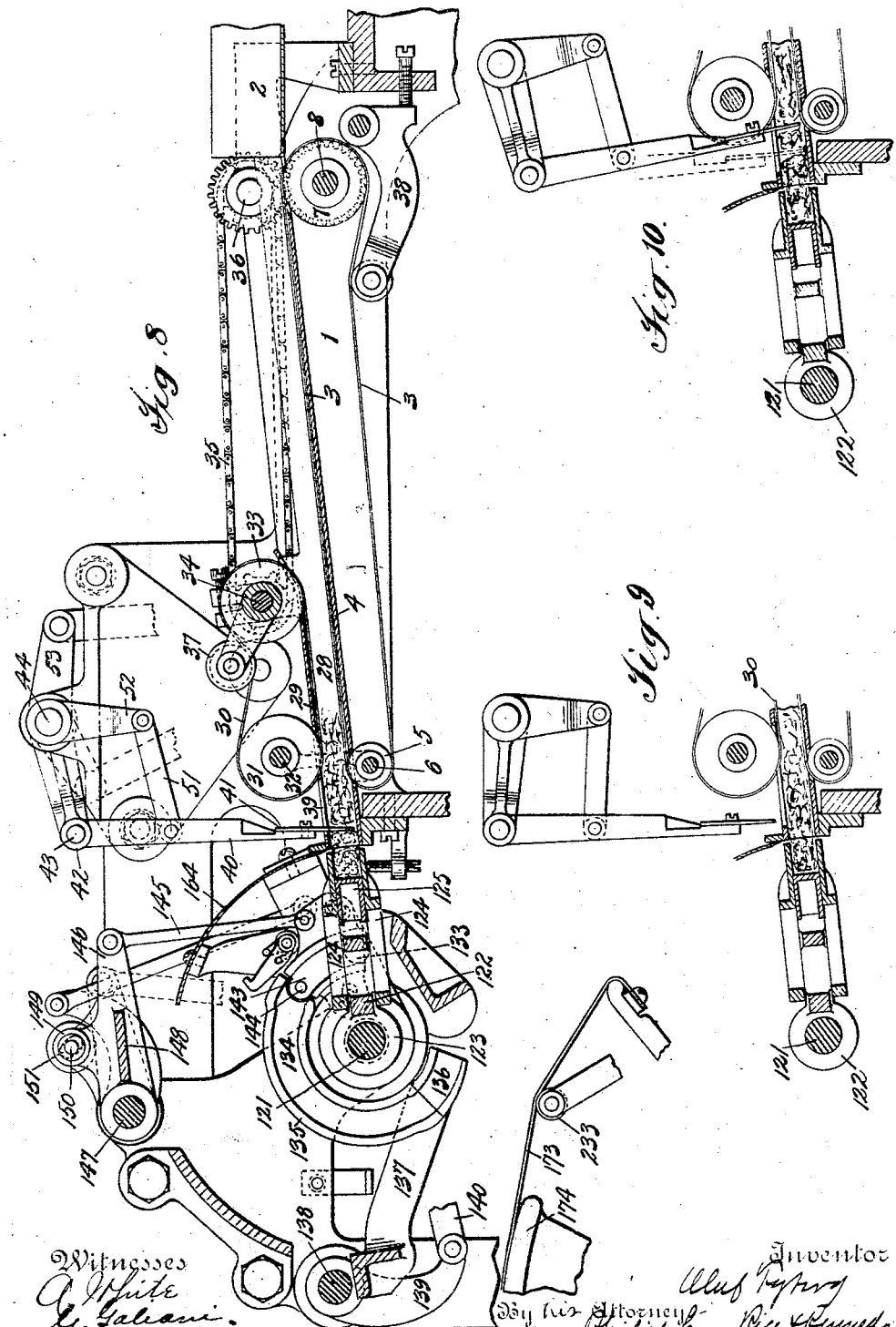

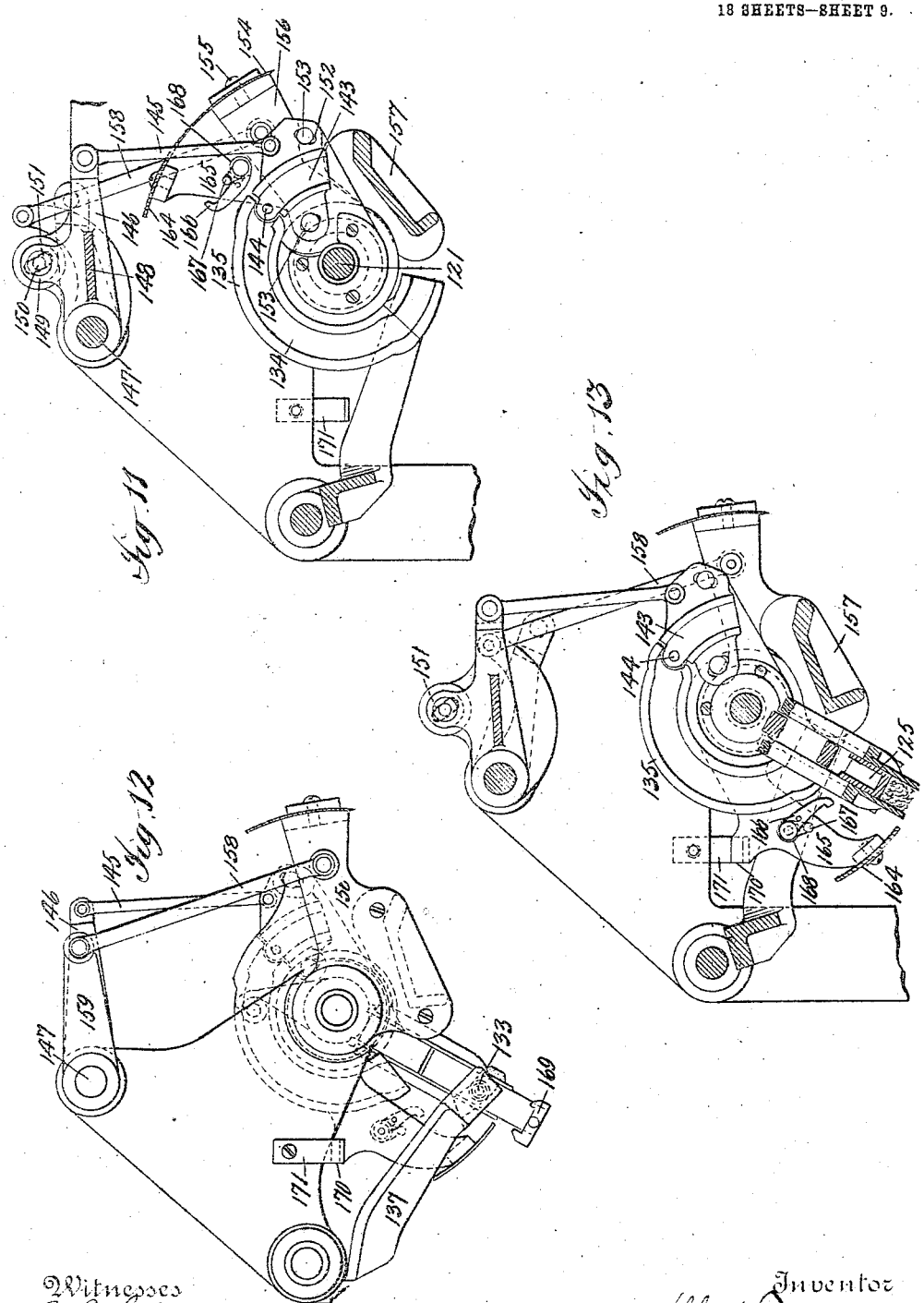

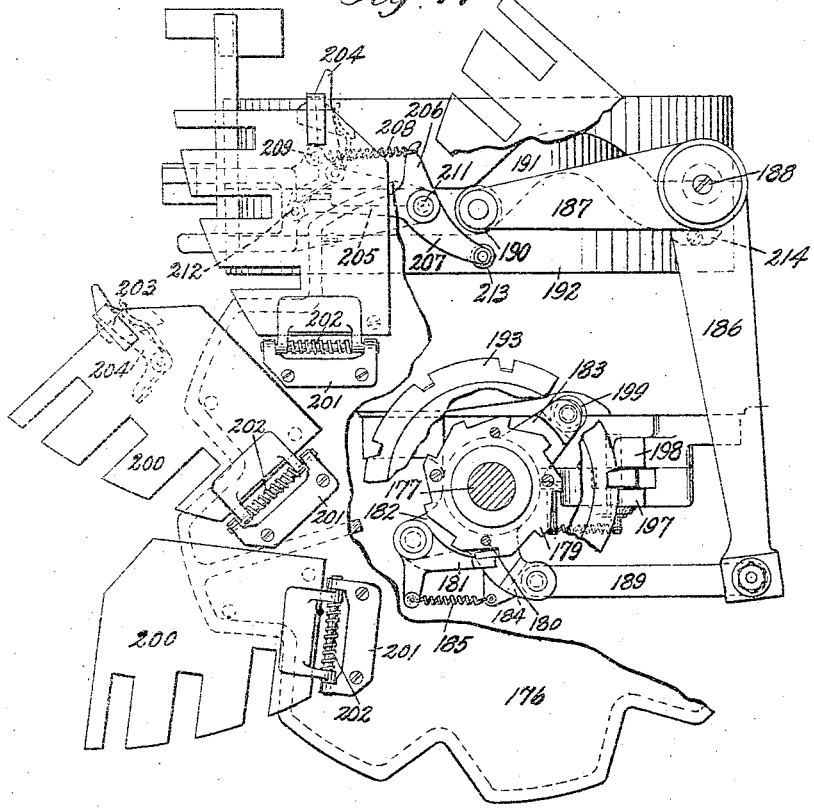

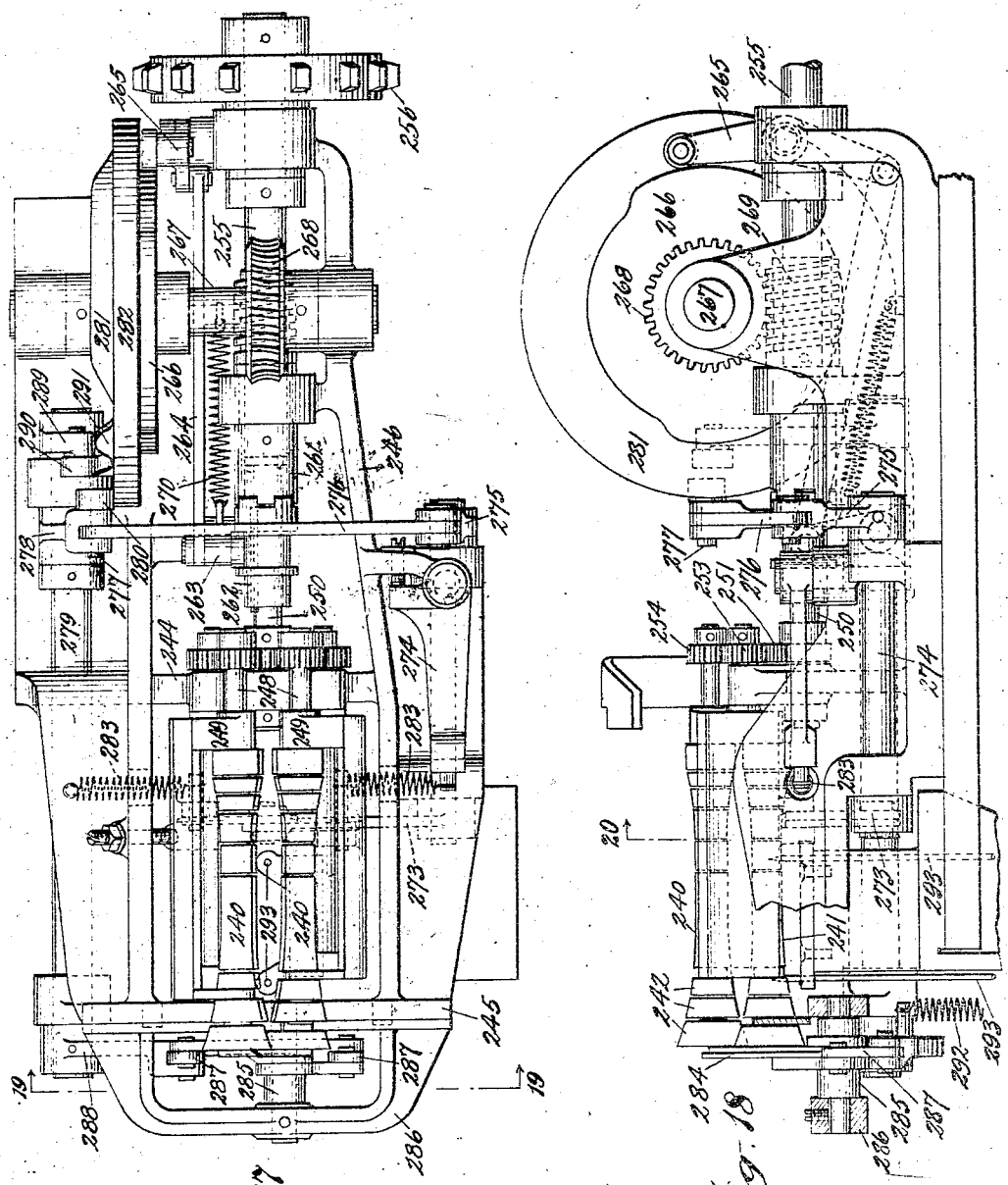

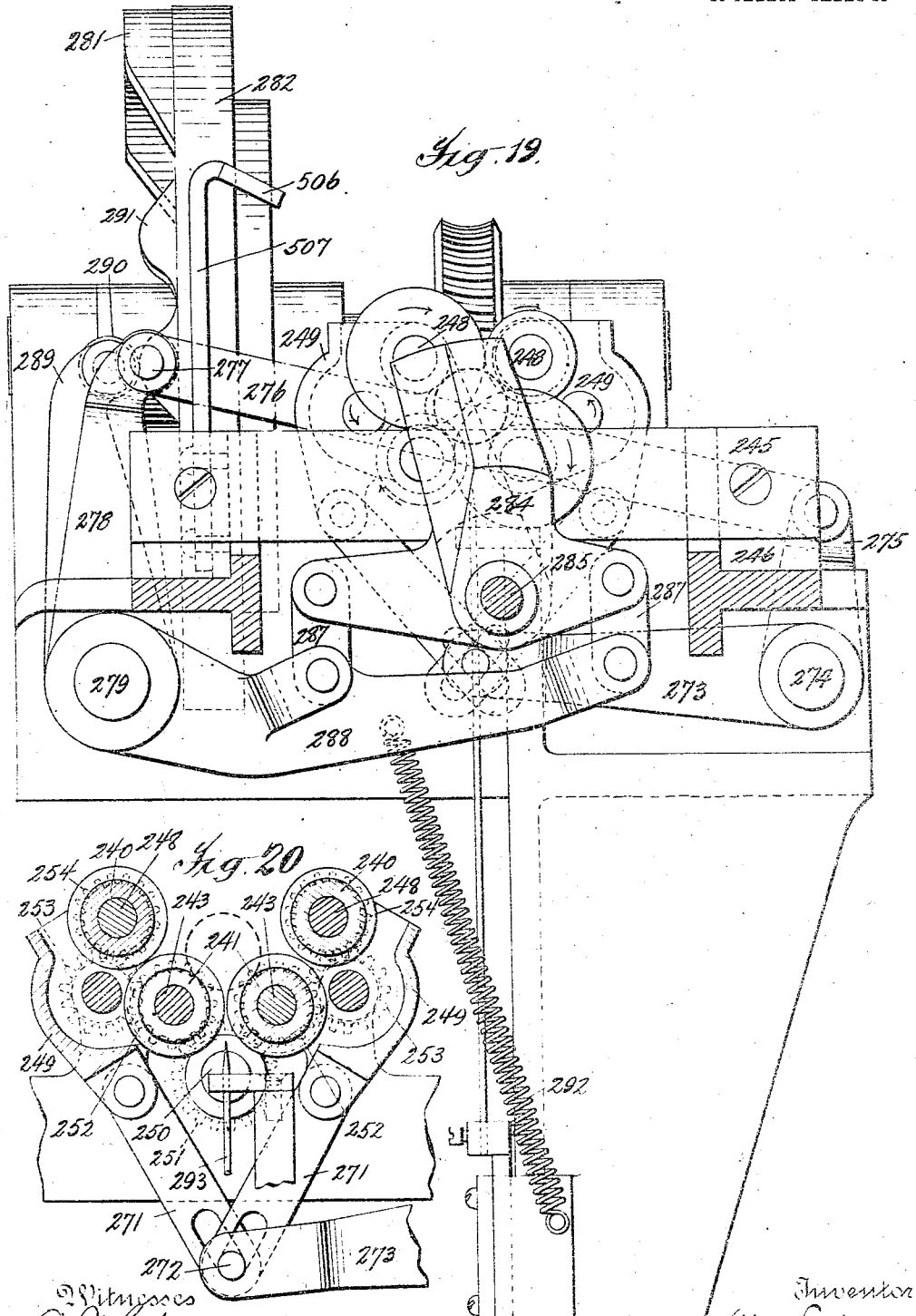

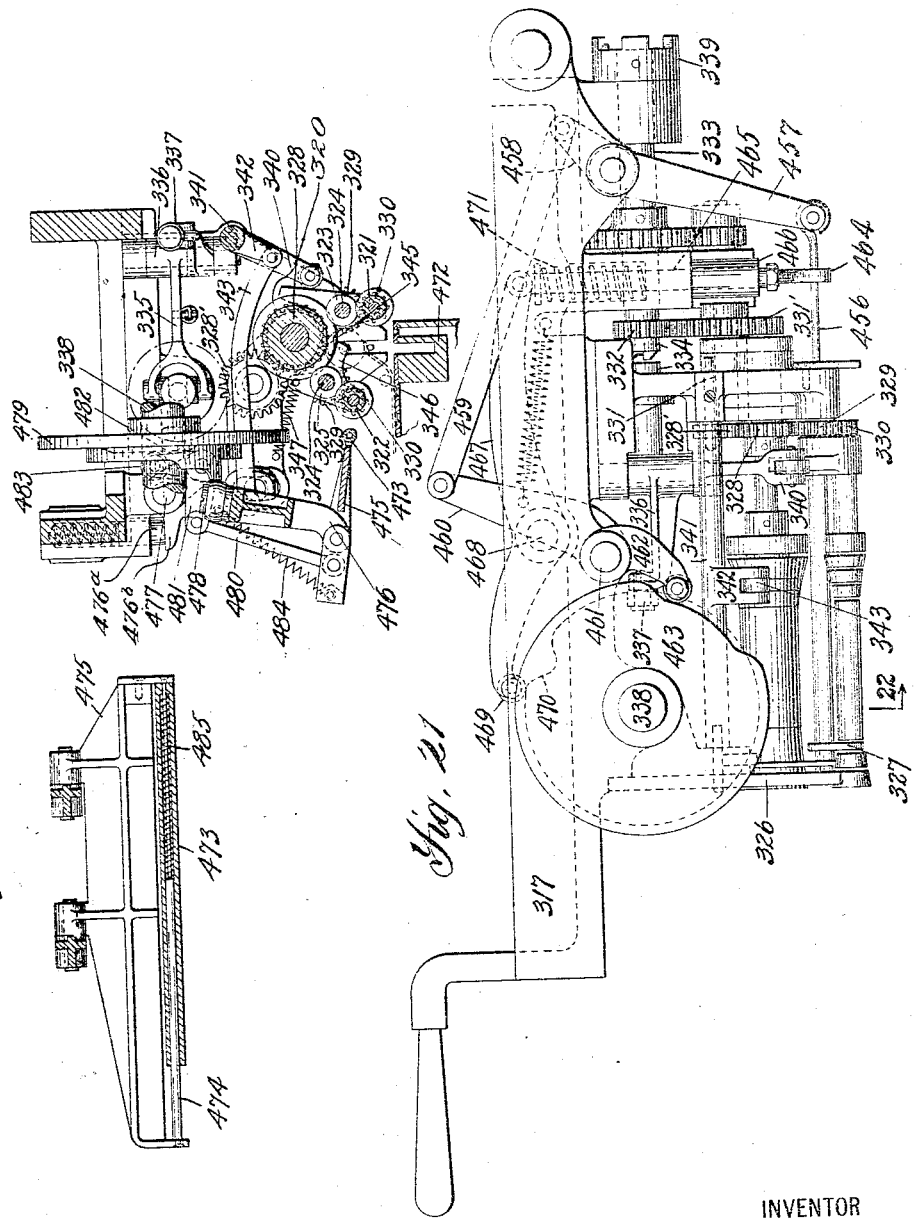

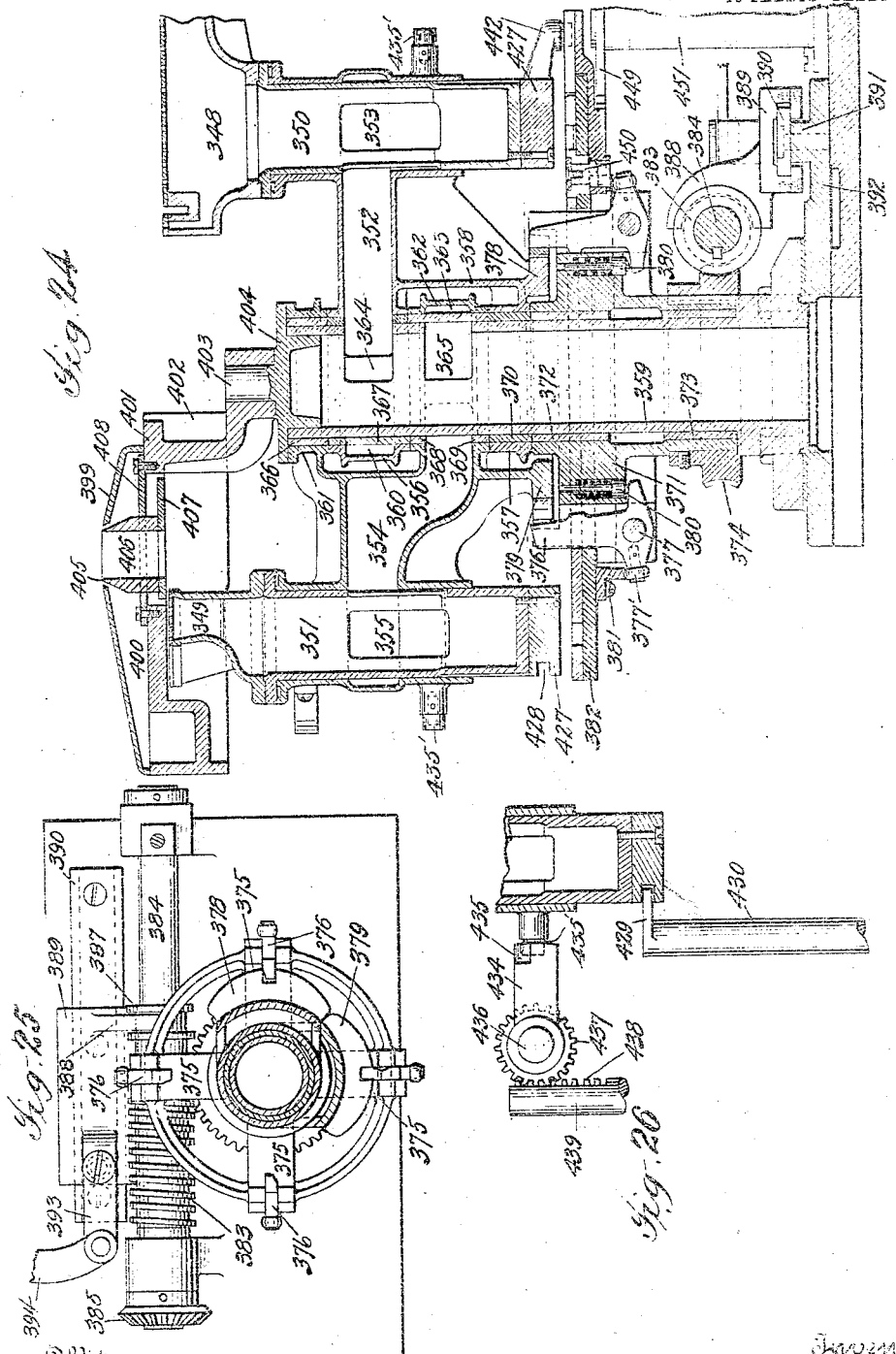

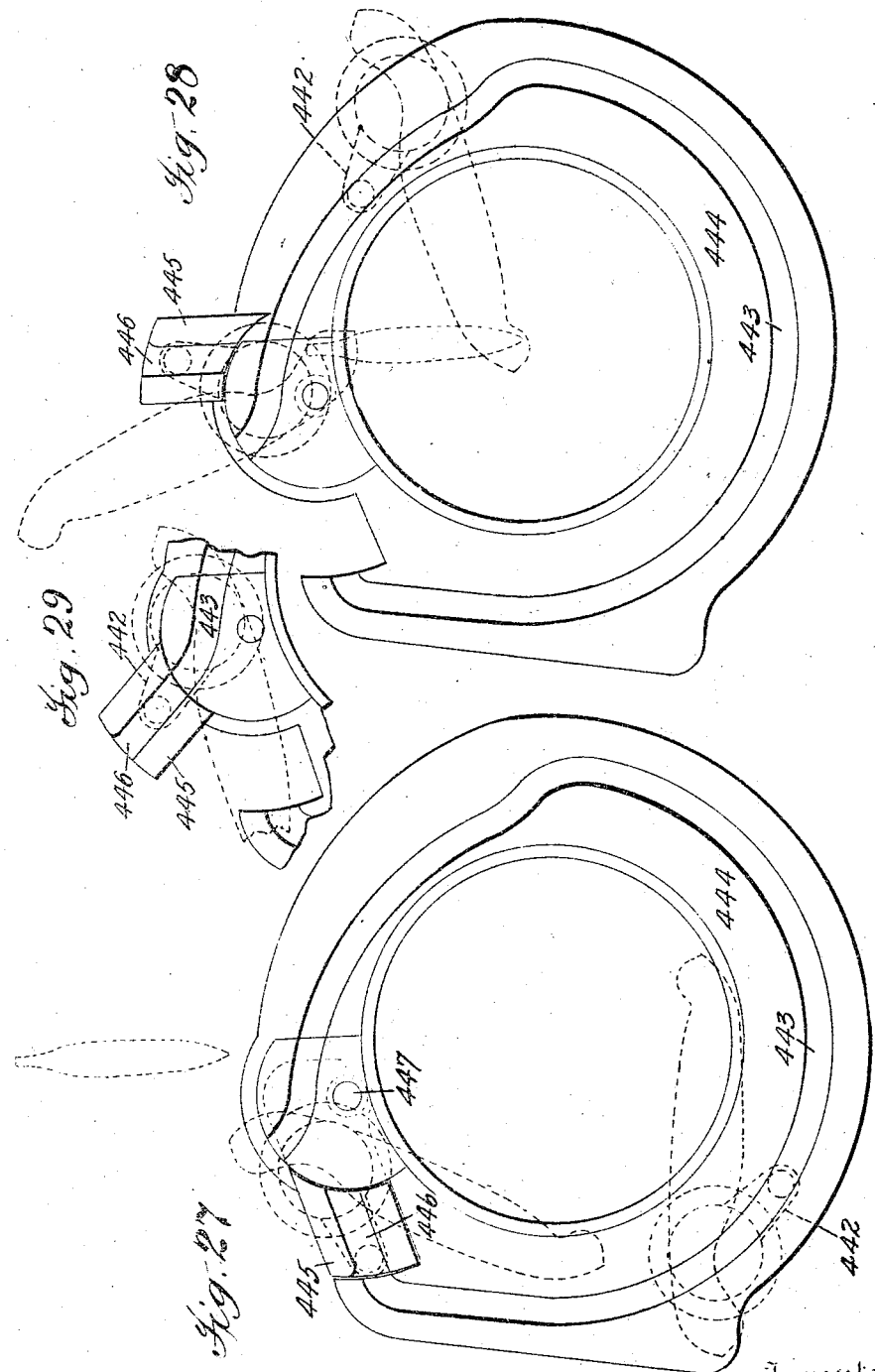

O. TYBERG.
CIGAR MACHINE.
APPLICATION FILED JUNE 10, 1905.

1,134,246.

Patented Apr. 6, 1915.
18 SHEETS—SHEET 18.

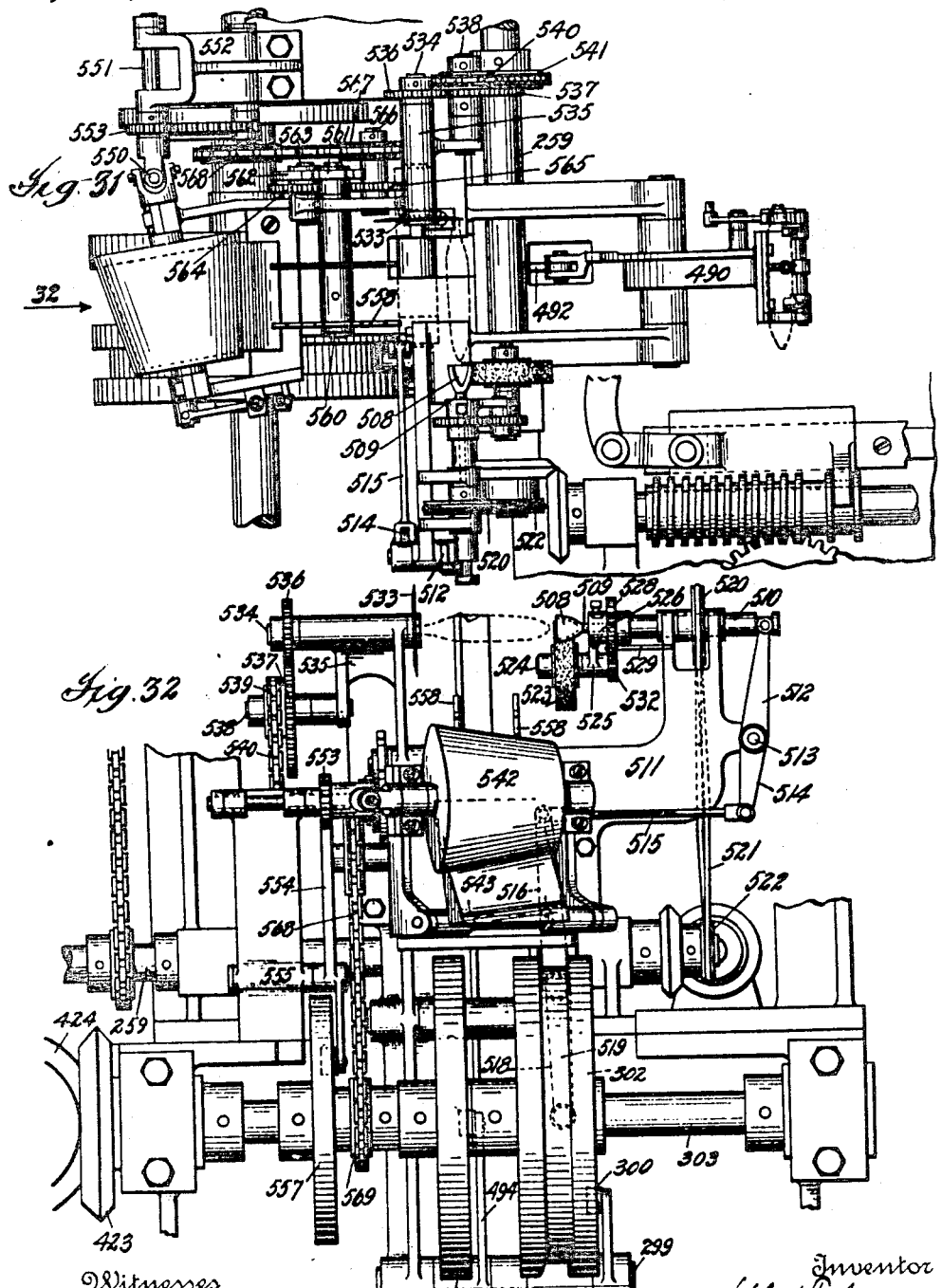

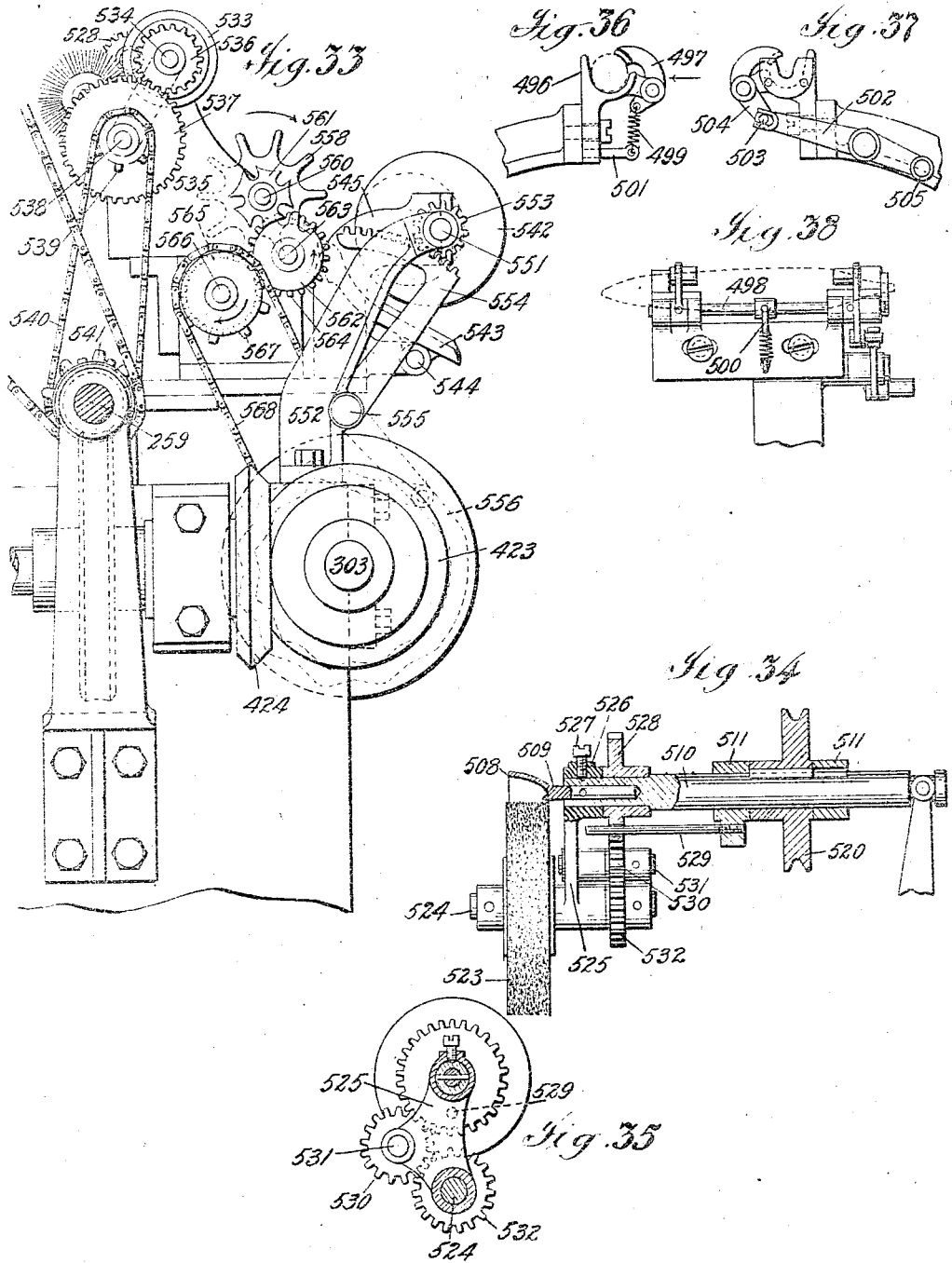

UNITED STATES PATENT OFFICE.

OLUF TYBERG, OF POINT LOMA, CALIFORNIA, ASSIGNOR TO INTERNATIONAL CIGAR MACHINERY COMPANY, OF NEW YORK, N. Y., A CORPORATION OF NEW JERSEY.

CIGAR-MACHINE.

1,134,246.   Specification of Letters Patent.   Patented Apr. 6, 1915.

Application filed June 10, 1905. Serial No. 264,568.

*To all whom it may concern:*

Be it known that I, OLUF TYBERG, a citizen of the United States, residing at Point Loma, county of San Diego, and State of California, have invented certain new and useful Improvements in Cigar-Machines, fully described and represented in the following specification and the accompanying drawings, forming a part of the same.

This invention relates to certain improvements in cigar machines.

In the operation of making cigars by machinery, it is usual to form the bunches in bunch making machines and then place them in molds in which they are allowed to stand a greater or less length of time, the molds operating to shape the bunches. The bunches are then removed from the molds and the wrappers are applied in a wrapping machine. This method of making cigars while applicable to the cheaper grades, is not used in making high grade cigars for the reason, among others, that the trade objects to what is known as mold work in high grade goods.

An attempt has been made to produce cigar machines in which the entire operation of making cigars is performed by machinery, the bunch being first made by suitable mechanism and then transferred immediately to a wrapping mechanism. For reasons not necessary to state here, the machine referred to has never gone into commercial use.

It is one of the objects of this invention to produce an improved cigar machine in which the entire operation of making cigars shall be performed.

A further object of the invention is to improve the details of construction of cigar machines.

With these and other objects in view, the invention consists in certain parts, improvements and combinations which will be described and then specifically pointed out hereinafter.

In the accompanying drawings—Figure 1 is a side elevation of a machine embodying the invention. Fig. 2 is a plan view of the construction illustrated in Fig. 1. Fig. 3 is an end view of the construction shown in Fig. 1, the position of the observer being indicated by the arrow 3 in that figure, certain parts of the mechanism being omitted. Fig. 4 is a sectional plan view, the plane of section being indicated by the line 4—4 of Fig. 3. Fig. 5 is an enlarged detail view of the mechanism for operating the filler feed. Fig. 6 is a plan view of the filler feeding device and the operating mechanism therefor, the figure illustrating also the charge carrying mechanism. Fig. 7 is a sectional view on the line 7—7 of Fig. 1. Fig. 8 is a detail sectional view illustrating the operation of the filler feeding devices and showing also the construction of the charge carrying mechanism and the position of the bunching apron. Figs. 9 and 10 are detail sectional views illustrating the operation of the filler feeding mechanism. Figs. 11, 12 and 13 are detail views illustrating the operation of the charge carrying mechanism. Fig. 14 is a sectional plan view illustrating the construction of the binder feeding mechanism. Fig. 15 is a side elevation of the construction shown in Fig. 14. Fig. 16 is a detail view illustrating the construction of one of the binder holding devices. Figs. 17 and 18 are respectively plan and side views of the manipulating and shaping mechanism. Fig. 19 is an enlarged sectional view on the line 19—19 of Fig. 17. Fig. 20 is a sectional view on the line 20—20 of Fig. 18. Fig. 21 is a side view of the wrapping rolls and certain features connected therewith. Fig. 22 is a section on the line 22 of Fig. 21. Fig. 23 is a detail view illustrating the construction of the wrapper tensioning device. Fig. 24 is a sectional view illustrating the construction of the wrapper supports and the operating means therefor, and Figs. 25 and 26 are detail views illustrating certain features of the operating mechanism of the construction shown in Fig. 24. Figs. 27, 28 and 29 are diagrammatic views illustrating the operation of the wrapper supports. Fig. 30 is a side view, partly in section, of the left hand end of the machine, as appears in Fig. 1, illustrating more particularly the relative position of the manipulating, wrapping and finishing mechanisms, and certain parts of the operating mechanism therefor. Fig. 31 is a plan view of the finishing mechanism illustrated in Fig. 30, the position of the observer being indicated by the arrow 31 in that figure. Fig. 32 is an end view of the construction shown in Fig. 31, the position of the observer being indicated by the arrow 32 in that figure. Figs. 33, 34 and 35 are detail views, illustrating the construction of the smoothing mechanism and the operating means therefor. Figs. 36, 37 and 38 are detail views illustrating the construction of the gripper mechanism on the transferring arms.

In the particular machine selected to illustrate the invention, the filler having been cut to suitable length and, when a perfecto cigar is to be formed, preferably having its edges notched in a manner well-known in the art, to permit the taper at the head and tuck of the cigar, is forwarded in a mass to suitable devices which operate to separate from the mass sections of filler suitable for the formation of bunches. The filler advancing devices, which may be varied considerably in construction, are located at the right hand end of the machine as shown in Fig. 1, and are supported in a pair of brackets marked 1, these brackets forming a part of the side frames of the machine. The brackets 1 serve to support a trough-like table 2 on which the filler is placed by the operator and which serves as a source of long filler supply. From this table 2 the filler, in the particular machine shown, is advanced into the range of action of means which operate to forward it so that it may be acted upon by the feeding devices. This forwarding mechanism may be constructed in various ways. In the particular construction shown, it includes a carrier which may be formed in any convenient manner, but which, as illustrated, consists of belts 3, (see Figs. 2 and 8). These belts, in the particular construction shown, run over a table 4 supported in the brackets 1, and at their lower ends pass around an idle roller 5 journaled on a shaft 6 which is in turn supported in brackets 1. The belts, when belts are employed, may be driven in any suitable manner. As shown, the belts at their upper ends pass around a roller 7 secured to a shaft 8, the shaft being mounted in suitable bearings in the brackets 1. The shaft 8 is provided with a gear wheel 9 which meshes with a gear 10 mounted on a stud 11 secured to one of the brackets. The movement may be given the carrier belt in any suitable manner, but in the best constructions a step by step movement will be used for this purpose. In the particular construction shown, the stud 11 carries a ratchet wheel 12 which is engaged by a pawl 13 mounted on an arm 14, said pawl being held up to its duty by a spring 15. The arm 14 is connected to a hub 16 loosely mounted on the stud 11, and from this hub extends a slotted arm 17. To this slotted arm 17 is secured a connecting rod 18, the other end of which is secured to an operating lever 19 fulcrumed on a stud 20 extending from one of the brackets 1. While the means for operating the lever 19 may be of any suitable character, in the best constructions it will be positively operated, and to this end the lever 19 will be provided with a cam roll 21 which runs on a cam 22, this cam being fast on a shaft 23 which is one of the main cam shafts of the machine. The return movement of the lever 19 to give the pawl a fresh take may be accomplished in any desired manner. In the particular construction shown, this is accomplished by means of weights 24 secured on a connecting rod 25. This rod has a slot 26 which takes over a pin 27 in the end of the lever 19. The function of this feature of the construction will be adverted to later.

The filler tobacco is forwarded by the belts 3 into a channel 28 (see Fig. 8) the bottom of which is formed by the plate 4 and the belts 3 before referred to, and the top of which is formed by a slotted plate 29. Beneath this slotted plate runs a pair of driven belts 30, these belts passing over a pair of idle rollers 31 journaled on a stationary shaft or rod 32 and over a pair of driven rollers 33 mounted on a shaft 34 which is journaled in the brackets 1 and driven by a sprocket chain 35, or in any other suitable manner, from a short shaft 36 (see Fig. 5) which is driven by suitable gearing from the shaft 8. A pair of belt tighteners 38 of usual construction is or may be employed with belts 3, and another pair of belt tighteners 37 of usual construction is or may be employed with the belts 30.

In connection with the filler forwarding mechanism so far described, there will be, employed a feeding mechanism which operates to forward and compress the filler and deliver it to a separating mechanism, to be hereinafter described, which acts to separate sections or charges from the forwarded mass of filler, each of which is sufficient to form the filler for a single cigar. The feeding mechanism referred to may be varied in its construction, but, in the best constructions, it will be of such a character as to produce a limited pressure only on the filler material to avoid packing it too hard, and will also be constructed to be engaged with the material to give it the forward feed and thereafter to be disengaged from the material and again engaged to take a fresh hold. The operating mechanism by which the feeding device is actuated to produce the limited pressure referred to on the material will further, in the best constructions, be of such a character that its action may be interrupted before the mechanism which disengages the device from the material acts.

The construction of the feeding device proper may be varied within wide limits. In the particular construction shown, the plate 29 is provided with a series of slots 39 through which work the tines 41 of a fork 40. While this fork, when a fork is employed, may be operated in various ways, in the particular construction shown, it is given a four motion movement by the folowing mechanism. The fork is carried by a bracket 42, the fork being secured thereto (see Figs. 5 and 6) by a pin 43. This bracket is loosely mounted on a shaft 44 journaled in bearings mounted on the brackets 1. The bracket 42 has an arm 45 formed integrally therewith to which is pivoted a connecting rod 46 (see Fig. 5). The other end of this connecting rod is secured to a rock lever 47, 48 pivoted on the stud 20 which is the stud on which the lever 19 is pivoted. The arm 48 of this lever carries a bowl 49 which runs on a cam 50 fast on the shaft 23, this cam being shaped so as to rock the arm at proper times, and, through the connections described, raise and lower the fork 40.

The means for giving the fork its forward and backward movements, that is to say, the movements by which it is caused to forward the tobacco in the channel and be retracted for a fresh take at the end of its forwarding movement may be widely varied, but the mechanism by which the forwarding movement is effected will be of such a character as to cause the fork to produce only a limited amount of pressure on the material in the channel, to avoid packing the material too hard and thereby getting too much material in any given bunch. In the particular construction shown, the fork 40 (see Figs. 5, 7 and 8) has connected to it a link 51, secured to an arm 52 which is fast on the shaft 44. The shaft 44 has also fast on it an arm 53 connected by a long link 54 (see Fig. 5) to the rock-lever 19 before referred to. When the rock lever 19 is raised by its cam to operate the pawl and ratchet mechanism which actuates the feeding belt, the fork 40 will be retracted, the fork at this time having been raised out of the feeding channel by the mechanism before described. After the fork has been retracted, it is drawn down into the material by the action of the lever 47 operating through the connections before described and is then ready for its forwarding movement. The lift of the lever 19 has raised the weights 24 mounted on the slotted connecting rod 25. The cam 22 is so shaped that at the time the forwarding movement of the fork is to take place, the high part of the cam passes out from under the roll 21, thus allowing the weights to act on the lever 19 and through the connections described effecting the forwarding movement of the fork 40. Should the resistance of the tobacco in the channel be greater than the force developed by the weights 24, the forwarding movement of the fork will stop. This of course, will stop the descent of the weights 24 and through the operating connections before described, will decrease the take of the pawl on the ratchet wheel 12, so that the next forwarding movement of the feeding belts will be less. In other words, the feed of the fork itself and the feed which supplies the tobacco to the fork are both controlled automatically by the amount of tobacco which is contained in the channel 28 ahead of the fork.

After the advancing movement of the fork or other feeding means is completed, it is disengaged from the tobacco by the action of the rock lever 47 and its connections, and the cycle of movements is repeated, the advancing movement of the fork or other feeding means varying with the amount of tobacco in the feeding channel ahead of the fork.

In the best constructions, means will be provided for interrupting the action of the feeding mechanism before the disengaging mechanism acts, the purpose of the construction being to prevent the upper layer of tobacco in the channel from being torn by the withdrawal of the fork. The means whereby the action of the feeding mechanism is interrupted as described may be varied within wide limits. In the particular construction shown, there is provided a rock lever 55—56 pivoted at 57 on a bracket 58 extending from the frame of the machine, the arm 55 of this lever being connected to the rod 25 which carries the weights 24. The arm 56 of the lever carries a roller 59 which is so positioned as to be struck by suitable cam projections 60 on a disk 61 which is mounted on the shaft 23. These projections 60 are so arranged as to raise the rod 25 and thus relieve the lever 19 from the force of the weights before the disengaging mechanism operates. The slot 26 before referred to in the rod 25 and its coöperating pin 27 permit the weights to be lifted without interfering with the movement of the lever 19, so that the action of this lever on the pawl mechanism for operating the carrier is not disturbed.

There is employed in connection with the feeding channel and the feeding mechanism heretofore described a charge carrier which is constructed to receive a sufficient amount of compacted tobacco to form the filler for a single cigar, and this charge carrier is at proper times and by suitable mechanism caused to register with the mouth of the feeding channel, so that the tobacco may be fed thereinto by the feeding mechanism, after which the charge is separated from the mass of the tobacco by a suitable separating device which in the construction shown includes a knife.

The charge carrier may be of any suitable or desired construction. In the machine illustrated, there is provided a shaft 121 (see Figs. 8–13) which is suitably supported in the frame. To this shaft is connected a casting 122, this casting having a pair of hubs 123 surrounding the shaft. To this casting 122 there is bolted a pair of side plates 124, said side plates forming the sides of the charge carrier. In the construction shown, the bottom of the carrier also forms the ejector by which the charge is discharged therefrom and as illustrated the bottom is formed by a movable block 125 which moves between the side plates 124 before referred to.

The charge carrier, as before indicated, is swung from its position in front of and registering with the mouth of the feeding channel to its discharge position. While this movement of the carrier may be effected in any suitable manner, it is, in the machine illustrated, effected by giving the shaft 121 a rocking movement. To this end, the shaft is provided (see Figs. 1 and 6) with a gear 126 which gear is engaged by a rack 127 on a lever 128 pivoted at 129 to the frame of the machine. This lever is fast on a hub to which is secured a second arm 130 (see Fig. 7) which engages a cam groove in the cam disk 61 mounted on the shaft 23 before referred to.

Suitable devices are provided for controlling the position of the block 125 which forms the bottom of the carrier and for giving it its ejecting movement. These devices may be varied in character. In the construction shown, however, the block 125 is provided at its ends (see Fig. 8) with cam rolls 133, said rolls engaging grooves 134 in stationary cam disks 135. The grooves in these cam disks are substantially concentric with the center of movement of the carrier, so that the block or bottom 125 will be held stationary with respect to the side plates as the carrier rotates. As the carrier nears its discharging position, the rolls 133 engage grooved blocks 136 carried on arms 137, said arms being mounted on a shaft 138 which is suitably supported in the frame of the machine. This shaft has secured thereto an arm 139 and to this arm is secured a connecting rod 140 which is secured at its other end to an operating lever 141 suitably pivoted on the frame of the machine. This lever 141 carries on its other end a cam roll 142 which engages with the cam groove in the cam disk 61 (see Figs. 6 and 7). The cam is so timed that when in the rotating movement of the carrier the rolls 133 have run into the grooved blocks 136, the cam operates through the connections described to swing the arms downward, thus causing the charge to be ejected from the box. The ejecting position of the box is clearly indicated in Fig. 12.

Means are preferably provided for varying the capacity of the carrier, and in the machine illustrated, this is effected by varying the position of the block 125, though it might be accomplished in other ways. The means for varying the position of the bottom of the carrier and thus determining the amount of filler which is to be fed therein,—the amount of filler of course varying for different sizes of cigars,—may be varied in character. In the construction shown, a pair of grooved blocks 143 are provided for this purpose, these blocks being pivoted at 144 to the disk 135 in which the grooves 134 are formed. The grooves in these blocks are arranged to register with the grooves 134 in the disks 135, and as these blocks are swung toward and away from the center of rotation of the charge carrier, the bottom of the carrier, when the rolls 133 run in the grooves of the blocks 143, will be caused to approach nearer or recede from the top of the plates 124. The means for changing the position of the grooved blocks 143 may be of any suitable character. As shown, there is secured to each of the blocks 143 a connecting rod 145 said rods being connected to arms 146 loosely mounted on a shaft 147 which is supported in the frame of the machine. These arms 146 are connected by a cross bar or web 148 and one of the arms 146 has an upwardly projecting ear 149 having a screw threaded perforation therein in which is located a screw 150. The screw passes through a slot in a boss 151 extending upward from the frame. By loosening the screw 150 the blocks 143 can be swung in one direction or the other in order to properly position the bottom of the charge carrier, the blocks being retained in their adjusted position by turning the screw in a manner well understood. In order to guide the blocks 143 in their movement, each of them is preferably provided with slots 152 in which slots are located guiding pins 153 fast on the frame of the machine.

After the charge carrier has been brought into registering position with the mouth of the feeding channel and after a proper amount of filler tobacco has been fed thereinto by the feeding mechanism, devices are employed to separate the charge from the mass of tobacco in the feeding channel. In the present construction, this separation of the charge is effected by means of a knife 154 which is secured by means of screws 155, or in any other suitable manner, to arms 156 which are loose on the shaft 121 before referred to. The arms 156 are, in the construction shown, tied together by means of a web casting 157, and each of the arms has secured to it a connecting rod 158, the other ends of these connecting rods being secured to arms 159 which are fast on the shaft 147 before described. The shaft 147 has secured to it an arm 160 and from this arm 160 a connecting rod 161 leads to a cam lever 162 pivoted on the stud 129, the other end of the cam lever having on its end a bowl 163 (see Figs. 1 and 7) which engages with a suitably formed cam groove in the cam disk 61 before referred to. At proper times, therefore, the knife is operated to sever the charge which is to be fed into the carrier, from the mass of tobacco behind it. While the mechanism for operating the knife is a convenient and effective one, it may be varied or other means substituted therefor, if desired.

After a charge has been severed from the mass by the knife 154 in the manner described, the charge carrier is swung by the mechanism hereinbefore described to carry the charge to the discharging point, and means will preferably be provided for retaining the charge in the box so that none of it will fall out as it is being transferred. While these means may be of any suitable character, in the construction shown, the charge is retained in the charge box by means of a cover plate 164, this plate being mounted on arms 165 which are loosely mounted on the shaft 121 before referred to. Each of these arms 165 carries a latch 166, these latches being held up against stop pins 167 by springs 168. The block 125 at each end is provided with notched keepers 169 which are arranged to be engaged by the operating ends of the latches. In the movement of the charge carrier from the position indicated in Fig. 8, for instance, around to the discharge position and just as the keepers come opposite the operating ends of the latches, the arms 165 being then in the position shown in Fig. 11 the block 125 is drawn down slightly, the cam groove 134 being properly formed for this purpose, so that the latches are positively engaged by the keepers and the arms 165 are locked to the charge carrier. At this time, the cover plate closes the mouth of the carrier and the arms move with the carrier until it approaches its delivery position. Just before the carrier reaches the delivery position projections 170 (see Figs. 11, 12 and 13) engage stops 171 secured to the frame of the machine and the movement of the arms 165 is stopped. Just at this time the block 125 is slightly moved outward by the cam groove which is properly formed for this purpose, so as to disengage the keepers 169 from the latches, thus permitting the carrier to continue its movement, and as it continues its movement it passes off the cover plate and is then operated through the mechanism before described to discharge its contents.

On the return movement of the carrier, it picks up the arms 165, the latches and keepers operating as before, and the arms swing back with the charge box until the position illustrated in Fig. 11 is reached, at which time the movement of the arms is stopped, the cover plate coming in contact with the knife 154, thus bringing it to a standstill, the latches being released and the carrier continuing its movement.

In the construction illustrated, the charge carrier acts as a transferring mechanism to transfer the charge from the feeding channel to a rolling mechanism which may be of any suitable character. The rolling mechanism illustrated is of the well-known Chianti belt type, the belt being marked 173 and the rolling table 174, the parts being so arranged that the loop in the belt will be in position to receive the charge from the charge carrier when the same is ejected by the movement of the bottom of the carrier. It may be here remarked that the mechanism is so arranged that the ejector bottom passes well down into the loop so as to deliver the charge in well-compacted condition to the loop of the belt. Prior, however, to the delivery of the charge to the rolling mechanism, a binder or wrapper is placed on the belt of the rolling mechanism. While this might be done by hand, if desired, in the best constructions, the placing of the binder in the rolling mechanism will be automatically effected.

The automatic binder feed may be widely varied in its construction. As illustrated, there is employed a carrier having a plurality of supports which are caused to successively come into position to deliver the binder to a transferring mechanism which carries it to the rolling mechanism. In the best constructions and as illustrated (see Figs. 14 to 16), these supports consist of notched plates 175. The means by which these plates are successively brought into delivery position may be of any desired description. As shown, these plates are fixed to a rotating table 176, the table being provided with notches in its edge as illustrated and for a purpose to be hereinafter referred to. This table 176 is mounted on a stud 177 which is supported in a bracket 178 extending from the main frame of the machine. The table 176 has secured to its under side a ratchet 179, the securing means being dowel pins 180 (see Fig. 14). This ratchet is stepped around to bring the plates successively into delivery position by means of a pawl 181 pivoted on one of the prongs 182 of a three pronged pawl carrier the other prongs being marked 183, 184. The pawl is held forward to its duty by means of the usual spring 185. The three pronged pawl carrying lever is operated, in the construction shown, by means of a bell-crank lever 186—187 pivoted at 188 to the frame of the machine, the arm 186 having secured to it a connecting rod 189 which leads to the arm 184 of the three pronged lever. The arm 187 carries a cam roll 190 which is operated by a cam groove 191 in a cam disk 192 on the main shaft 23 before referred to.

In order to prevent any movement of the table when the pawl is disengaged therefrom, suitable locking devices are preferably provided. While these locking devices may be of any suitable character, in the construction shown the table has secured to it by the dowel pins 180 a notched plate 193, the notches being engaged by a locking pawl 194 which is pulled forward by a spring 195, said pawl being pivoted on a bracket 196. The upper end of this bracket 196 is provided with a fork 197 and the bracket 178 which carries the bracket 196 is formed to provide a second fork 198. The pawl 194 is guided in its movement between these brackets. It is obvious that before the table can be moved by the pawl 181, the locking pawl must be released. In the construction shown, this is effected by a roller 199 which is carried on the arm 183 before referred to, the parts being so positioned that the roller strikes the pawl 194 and forces it back against the stress of its spring just at the time when the pawl 181 effects its movement.

It is customary to form the binders of cigars of two or more overlapped leaves, and in order that these leaves may be properly held in position on a support, there are preferably provided clamps which coöperate with the supports. While the construction of these clamps may be varied, in the machine illustrated, they consist of notched plates 200, these plates being hinged to brackets 201 fast on the table 176. In the specific construction shown, these clamps are thrown open at the proper time by springs 202 and they are held closed by suitable locking devices, although the construction may be varied, if desired. The locking devices employed may be of any suitable character. As shown, the clamp plates 200 are provided with angular notched keepers 203, these keepers being engaged by pivoted spring held latches 204 secured to the underside of the supports 175. In the operation of the machine, the clamps are automatically opened to permit the binder to be placed thereon by the operator, although they might be opened by hand, if desired. In order to unlock the locking devices, and thus permit the springs 202 to throw up the clamps, there is provided, in the specific construction illustrated, a three pronged releasing lever, the several prongs of the lever being marked 205, 206, 207. The releasing lever is normally held in an inoperative position by means of a spring 208 secured to the prong 206 and to a boss 209 mounted on a bracket 210 extending from the main frame, this bracket also serving to support the pivot pin 211 on which the releasing lever is mounted. The arm 205 of the releasing lever is provided with a pin 212 and the arm 207 is provided with a roll 213, said roll being arranged in the path of a block 214 on the cam roll or drum 192 before referred to. At the proper time, this block 214 strikes the roll 213 on the arm 207 and throws the pin 212 forward, causing it to strike the tail of the latch 204, thus disengaging it from the keeper 203 and permitting the spring 202 to throw up the clamp. When the clamp is thus opened, the operator lays the binder leaves thereon, and in the machine illustrated, closes the clamp by hand.

The mechanism for transferring the binder from the wrapper or binder support to the wrapping mechanism may be widely varied in character. As shown, this mechanism embodies a swinging transferrer which includes a bar 216, this bar being provided with a fork which embraces the top of a lever 218, the bar being secured to the lever by a pin 219. In the best form of the construction and when notched binder supports are employed, the transferrer will employ one or more grippers to coöperate with the notched supports. In the construction shown, the bar 216 is provided with three gripper fingers 220 which are fast to the bar, and coöperating with these gripper fingers are three movable fingers 221 fast on a rod 222 which is supported in brackets extending from the bar 216. In order to swing the grippers into position to take the binder from a support, the lever 218 which is a bent lever and pivoted to the frame at 223, has secured to it a connecting rod 224 (see dotted lines in Fig. 1). This connecting rod 224 is connected to a bent lever 225 which is fast to a hub 226 and extending from this hub is an arm 227 having a cam roll which engages with a cam groove in the side of the cam roll or drum 192.

The gripper fingers 221 are normally held closed by a spring (not shown) this spring being of a usual character, and it is necessary, therefore, when such a construction is employed, to open the grippers at the proper time to cause them to seize the edge of the binder which is held by the binder support. In order that the grippers may be opened as indicated, the rod or shaft 222 has depending from it a curved arm 228 which is struck by a lever 229 pivoted at 230 to the main frame and having on one of its ends a cam roll 231 which at the proper time is struck by a cam projection 232 on the periphery of the cam roll or drum 192. The gripper fingers extend into the notches of the binder support and are opened at the time they pass into these notches, so that they are in position to seize the edges of the binder leaves which overlie the notches in the support. Prior to the time the grippers start on their return movement, the lever 229 is rocked downward, in the construction shown, so as to permit the gripper spring to close the grippers. The grippers having thus seized the binder, are given their backward movement. Just before this backward movement commences, the unlocking mechanism for the binder supports before described operates and the clamp of the binder support is thrown up by its spring, so that the binder can be removed from the binder support.

The backward movement of the binder transferring mechanism is sufficient to cause the binder to properly overlie the loop in the belt of the rolling mechanism, and the binder is pushed down into the loop of the belt by the action of the ejector bottom of the charge carrier.

When the binder has been properly positioned in the rolling mechanism and the charge carrier has deposited the filler therein, the rolling is effected by causing the belt operating roller 233 to close the loop of the belt and travel over the table in the usual manner. The mechanism by which this roller 233 is operated may be of any of the usual types and is omitted from the illustration as unnecessary to an understanding of the invention and in the interest of clearness.

The position of the binder transferring gripper at the time when the loop in the belt is closed is shown in Fig. 1, and it is obvious that in order to permit the roller 233 to pass under this gripper, it is necessary that the gripper be raised. This may be effected by any desired mechanism. As shown, the block 216 has connected to it a link 234, this link being secured to a lever 235 which is pivoted at 236 to the bent lever 218 before described. This lever 235 has on it a cam roll which runs in a guiding slot 238 formed in a bar 239 suitably secured to the frame of the machine. This guiding slot 238 is curved but the curve is not concentric with the center 223 around which the lever 218 swings. As this lever 218 swings back from the position shown in Fig. 1, it will be seen that the lever 235 will be rocked upward and the gripper mechanism lifted so as to permit the roll 233 to pass thereunder.

When high grade cigars are to be entirely made in the machine, that is to say, when the machine embodying the invention includes both a bunch forming mechanism and a wrapping mechanism, it will be found advantageous, as a rule, to subject the bunch after it is made to the operation of a mechanism which acts to work up or "manipulate" the filler. This manipulation not only loosens up the filler so as to cause the bunch to be well rounded out at the proper points, but also improves the smoking qualities of the cigar. This manipulating mechanism when it is employed may be widely varied in its construction and variously located in the machine. In the particular construction shown, this mechanism is located close to the end of the table 174 of the rolling mechanism, and in the particular construction illustrated, comprises four rolls, the upper rolls being marked 240, and the lower rolls 241, (see Figs. 17, 18, 19, 20 and 30).

These rolls, when rolls are employed, will be of proper configuration to conform to the shape of the bunch and may, as illustrated, be provided with a plurality of loose sections 242 which are frusto-conical in shape, this construction allowing the sections to run at different speeds from the body of the rolls, thereby preventing any twisting of the bunch. These rolls may be mounted and operated in any convenient manner. In the construction illustrated, the shafts 243 of the lower rolls are mounted in cross webs 244, 245 (see Fig. 17) of a casting 246 (see Fig. 30) mounted on a bracket 247 suitably supported by the frame of the machine. The shafts 248 of the upper rolls 240 are mounted in swinging brackets 249 hung on the shafts 243 of the lower rolls, this construction permitting the upper rolls to be moved to open and close the roller group to receive and discharge the bunch. The rolls may be driven in any suitable manner. In the construction shown, there is mounted in the casting 246 a driving shaft 250 provided with a main driving gear 251 meshing with gears 252 mounted on the shafts of the lower rolls. The brackets 249 carry idle pinions 253 which are in mesh with gears 254 mounted on the shafts 248 of the upper rolls 240. The shaft 250 may be driven in any suitable manner. In the particular construction illustrated, there is provided a shaft 255 having a driving sprocket 256 which is driven by a chain 257 (see Fig. 30) from a sprocket wheel 258 on the main power shaft 259 of the machine. This shaft carries the driving pulleys 260. The shaft 255 carries a clutch member 261 (Fig. 17) which is engaged by a sliding clutch member 262 on the shaft 250, the shafts 250 and 255 being in line. The clutch member may be operated in any desired manner. As shown, the clutch member is shifted by a rock arm 263 connected by a rod 264 with a cam lever 265 pivoted on the casting 246, this cam lever being operated by a cam 266 mounted on a shaft 267 supported in bearings secured to the casting. This shaft 267 carries a worm gear 268 which is in mesh with a worm 269 on the shaft 255. The mechanism just described serves to throw the clutch out, the clutch being thrown in by a suitable spring 270.

The opening and closing of the group of rolls may be effected by any desired mechanism. As shown (see Fig. 20) each of the brackets 249 has pivoted to it a link 271, these links having slots in their lower ends which are engaged by a pin 272 carried on a lever 273, this lever being fast on a shaft 274 suitably supported in a casting 246. This shaft 274 has an arm 275 fast on it and secured to this arm is a connecting rod 276, the other end of this rod being secured by a pin 277 to an arm 278 loosely mounted on a shaft 279 suitably supported on the casting. The pin 277 carries a cam roller 280 which runs on a cam 281 mounted on a cam disk 282, this disk being in turn mounted on the shaft 267. Springs 283 are or may be provided to move the swinging brackets in a direction opposite to the movement produced by the connection so far described. By this construction, the brackets carrying the upper rolls 240 may be swung toward and away from each other to open and close the group of rolls.

If desired, a knife or knives may be employed to trim the end or ends of the bunch. In the particular construction shown, a pair of knives is employed for trimming one end of the bunch, these knives being marked 284. These knives are journaled on a stud 285, one end of which is supported in the casting before referred to, and the other by a bracket 286 secured to the casting. Each of the knives has a rearwardly projecting portion which is connected by a link 287 to an arm 288 on the shaft 279, this shaft being also provided with an arm 289 by which it is rocked. This arm carries a roll 290 which is actuated by cam projections 291 on the disk 282 before referred to, the movement of the shaft in opposition to the movement produced by the cam being effected by a spring 292 (see Fig. 19).

While the rolling mechanism might discharge the bunch directly into the manipulating or shaping mechanism, if desired, the bunch falling therein by gravity, for instance, in the best constructions the bunch will be positively placed in the shaping mechanism.

While any desired mechanism may be utilized for accomplishing this result, in the particular construction shown, there is provided a set of pins 293 (see Figs. 17, 18 and 30) these pins having a reciprocating movement and being carried on a slide 294. This slide moves in guides 295 carried on a bracket 296 depending from the casting 246. This slide is connected by a link 297 to a lever 298 pivoted at 299 to a bracket secured to the bed plate of the machine, the other end of this lever carrying a roll 300 which runs in a closed cam 301 formed in a cam disk 302 fast on a shaft 303 which is one of the main cam shafts of the machine. The cam 301 is so shaped that at the time when the rolling mechanism is to deliver the bunch, the pins are in position at the end of the rolling table, so that the rolling apron delivers the bunch onto the pins which impale it. The pins then descend and place the bunch in the group of rolls which form the manipulator or shaper. These pins have another function which will be hereinafter adverted to.

After the bunch has been operated upon by the manipulating mechanism, it is transferred to a wrapping mechanism which applies the wrapper thereto. This wrapping mechanism may be of any desired or approved type, and may be located at any suitable point in the machine. In the particular machine illustrated, this wrapping mechanism is located directly over the manipulating rolls referred to and the lifting pins 293 are operated at the proper time by the operating cam to transfer the bunch from the manipulating mechanism into the wrapping mechanism.

In the best constructions the wrapping mechanism will be mounted so that it may be given a movement with respect to the wrapper presenting devices to be hereafter described, in order that the wrapper may be properly wound upon the bunch. In the particular machine shown, the wrapping mechanism is given a right line reciprocating movement, this movement being, as will hereinafter appear, a movement across the path of movement of the wrapper presenting devices. While the means for mounting the wrapping mechanism so that it may be given the desired movement may be of any suitable description, in the particular construction shown, the machine is provided (see Figs. 1, 2 and 3) with a pair of upright standards 304 to which are bolted or otherwise suitably secured grooved ways 305. The wrapping mechanism is mounted in a carriage 306 provided with rolls 307 which work in the ways before referred to.

The means by which the wrapping mechanism is given the movement before referred to may be varied within wide limits. In the particular construction shown, the carriage (see Fig. 3) has depending therefrom a lug 308 to which is connected a link 309, the other end of this link being fast to one end of a cam lever 310, this lever being pivoted at 311 on a bracket which is fast on the machine frame. The other end of this lever carries a roll 312 which works in a cam 313 mounted on a cam shaft 314. This shaft is provided with a worm gear 315 which meshes with a worm 316 on the main power shaft 259 before referred to. In the best constructions, the wrapping mechanism will be supported with the wrapping members in a pendent position and the wrapper will be presented to the mechanism from beneath. While, as has been indicated, the particular construction of the wrapping members may be varied and the particular means for mounting them may be varied, in the specific construction illustrated the carriage supports a frame 317, this frame being pivoted (see Fig. 2) on studs 318 secured to the carriage. The other end of the frame rests on one of the cross bars of the carriage and is provided with a handle 319 which enables the frame and the wrapping members carried thereby to be turned up so that the parts of the wrapping mechanism can be inspected.

The wrapping members in the specific construction shown consist of a main wrapping roll 320 (see Fig. 22) and rolls 321 and 322, the rolls 321, 322 being mounted so that they may be opened to receive the bunch and closed when the wrapping operation is to be performed. When rolls are employed as the wrapping members, the means for mounting and operating them may be of any approved construction. As shown, the roll 321 is mounted in a bracket 323, this bracket being swung on one of a pair of parallel rods 324 which extend lengthwise of the rolls. The roll 322 is mounted in a bracket 325 which is swung on the other parallel rod. The forward ends of these rods are supported in a plate 326 carried on the frame 317. The forward ends of the rolls, or rather the shafts which support the rolls, are carried in links 327 swung on the parallel rods. This construction enables the rolls 321 and 322 to be moved toward each other to open and close the group. The rolls proper may be of any suitable construction. As shown, they are made up of a central section fast on the shaft and frusto-conical sections loose on the shaft, this being a construction well-known in the art. The rolls may be driven in any suitable manner. As shown, the shaft of the roll 320 is provided with a gear 328 (see Fig. 21) this gear being in mesh with intermediates 329 which are in turn in mesh with gears 330 on the shafts of the rolls 321 and 322. This gear 328 may be driven in any suitable manner from any suitable part of the machine. As shown, it is driven from a gear 328' mounted on the short shaft 331, this shaft carrying a gear 331' which is in mesh with a gear 332 loose on a shaft 333, which is the main driving shaft of the wrapping mechanism. The hub of this gear forms one of the elements of a clutch 334, the other element being a collar sliding lengthwise on the shaft in the usual manner. This clutch is operated by a lever, one arm 335 of which engages the collar and the other arm 336 carries a bowl 337 running on a cam mounted on a shaft 338 extending crosswise of the mechanism. This cam is so arranged that the driving of the rolls is intermitted after each rolling operation. The main shaft 333 is made in two parts (see Figs. 2 and 3) each of the parts carrying a part of a clutch joint 339, which joint enables the wrapping mechanism to be tilted up in the manner before described.

The devices for opening and closing the rolls, when rolls are used as wrapping members, may be widely varied. In the construction shown (see Fig. 22) there is provided an arm 340 which bears against an upward extension on the bracket 323, this arm being mounted on a rock shaft 341 suitably supported in the machine frame. Fast on this rock shaft is another arm 342 to which is connected an operating rod 343, the other end of this rod being connected to a bracket 476 which is intermittently moved by mechanism which will be hereinafter referred to, the movements occurring at proper times to give the proper movement to the bracket 323 to open the rolls. The bracket 323 carries an inwardly projecting arm 345 (see Fig. 22) which contacts with an inwardly projecting arm 346 mounted on the bracket 325. This bracket 325 has connected to it a spring 347, the other end of the spring being connected to the frame. When the arm 340 is moved inward it strikes the projection on the frame 323, swings the lower end of the frame outward and the projection 345 downward and outward. The downward movement of this projection causes a similar movement of the projection 346 which swings the bracket 325 against the tension of the spring 347 and opens the rolls. When the arm 340 is moved in the opposite direction, the spring 347 closes the rolls.

The wrapping mechanism will be provided with heading mechanism and pasting mechanism and with the usual nicker knives which operate to cut the wrapper. These devices may be of any approved form, but inasmuch as they have no relation to the present invention, an illustration and description of them is omitted. It will be further understood that the illustration of the wrapping mechanism is largely diagrammatic.

The wrappers may be presented to the wrapping mechanism in any approved manner and when automatically presented by any approved construction. In the best constructions, however, a plurality of wrapper supports will be employed on which the wrapper is held, these supports being given the proper movements at proper times to present the wrappers to the wrapping mechanism. In the particular construction shown, the wrapper supports comprise two suction carriers 348, 349, these carriers consisting of castings, the top of which is formed by perforated plates. The casting 348 (see Fig. 24) is secured to a sleeve 350 and the casting 349 is secured to a similar sleeve 351. The sleeve 350 is supported in a hollow arm 352, the sleeve having openings 353 which place the interior of the sleeve in open communication with the interior of the arm. The sleeve 351 is supported in a hollow arm 354, the sleeve having openings 355 by which the interior of the sleeve is placed in open communication with the interior of the arm. The arm 352 is carried by a double hub 356—357, these hubs being connected by a web 358. The hub surrounds a hollow standard 359 which is bolted or otherwise secured to the bed of the machine. The portion 356 of the hub is chambered out this being indicated at 360. The arm 354 is similarly supported by a double hub 361—362, the part 362 being chambered out, as indicated at 363. The construction is so arranged that the part 356 of the double hub 356—357 lies between the parts 361—362 of the other double hub. The part 362 of the double hub 361—362 lies between the parts 356—357 of the other double hub.

The hollow standard 359 has ports or openings 364—365. This hollow standard is in communication with any suitable suction producing device, not shown, through suitable connections, not shown. The suction is constantly acting, and through the openings which have just been described, the suction chambers 348, 349 are constantly in communication with the suction producing device. Bushings 366, 367, 368, 369, 370 are introduced between the several parts of the hubs and the hollow standard.

The wrapper supports will be given movements which will bring them successively into delivery position and in the best constructions, these movements will be such as to cause the supports to move beneath the wrapping mechanism. Further, in the best constructions, the supports will be given movements by which they will be enabled to properly present the wrapper to the wrapping mechanism. When the supports are of the character so far described and mounted as described, the movements given them will include a traveling or orbital movement around the hollow standard as a center, and a swinging movement by which each wrapper support is properly controlled and moved when it is delivering its wrapper to the wrapping mechanism.

The construction by which the supports are moved in the manner referred to may be varied within wide limits. In the particular construction shown, there is mounted on the hollow standard a hub 371, this hub having interposed between it and the standard two bushings 372—373. The hub has secured to it a worm gear 374. This hub 371 (see Fig. 25) is provided with a plurality of arms 375, four such arms being shown. Each of these arms has mounted in it a pivoted dog or latch 376, the pivot of the latch being indicated at 377. These latches are arranged to engage successively with notches in projections from the parts 357 and 362 of the double hub, the projection on the part 357 being marked 378 and the projection on the other part 362 being marked 379. The latches, in the particular construction shown, are held forward in engagement with the notches by means of spring pins 380. The latches may be thrown out of locking position in any suitable manner. In the particular construction shown, they will be thrown out by a stationary cam 381 mounted on the under side of a table 382 which is suitably supported in the frame of the machine. It will be seen that when either of the latches 376 is in locking position, the hub which the latch engages will be locked to and will move with the arm on which the latch is mounted, and since the arms 375 are fast on the hub they will move with the hub.

In the best constructions, the hub will be given a varying movement, the purpose of which will be later explained. In the particular construction shown, the worm gear 374 is in mesh with a worm 383, this worm being mounted on a worm shaft 384, this worm (see Figs. 24 and 25) being formed on an elongated hub splined to the shaft so as to permit the worm to have a movement on the shaft. This shaft 384 is provided with a beveled gear 385 which is in mesh with a bevel gear 386 on the shaft 259 (see Fig. 4), this shaft being the main power shaft of the machine. In order that the worm may be given the movement before referred to on the shaft, the elongated hub on which it is formed is provided with a collar 387 which is engaged by a fork 388 this fork being carried on a slide 389 which moves on a guide plate 390 secured to an upward projection 391 of a plate 392 resting on the bed of the machine. This slide 389 is connected by a link 393 to a lever 394 (see Fig. 4) pivoted at 395 to the bed of the machine. The other end of this lever carries a cam roll 396 which runs in a cam groove 397 on a drum 398 mounted on the shaft 314 which is the shaft carrying the cam by which the wrapping mechanism is moved.

The wrapper may be placed on the supports in any suitable manner. In the best constructions, however, the supports will be brought into proper relation with the cutting mechanism so that the wrapper may be on the support at the time the cutting mechanism operates. In the particular construction shown (see Figs. 2 and 24) there is provided a table 399 which forms the top of a suction chamber 400, the lower part of this chamber being formed by a casting 401 which is supported in the side frames and which also has a steadying projection 402 which engages a pin 403 on the top of a cap plate 404 which forms the top of the hollow standard 359. The table 399 is provided with an opening in which there is located a die or knife 405, this knife being arranged to inclose an interior space 406. there is a narrow space between the edge of the die and the edge of the table bounding the die through which the suction in the chamber 400 may act. The knife or die may be supported in any suitable manner. As shown, it rests on a plate 407 suitably secured to the casting and passing through an opening in a guide and steadying plate 408.

The device which coöperates with the die to effect the cut may be of any suitable character. As shown, there is provided a roller 409 (see Figs. 1 and 2) this roller being carried on an arm 410 which is pivoted on a slide 411, this slide working on a guide 412 fast to the frame of the machine. The end of the arm opposite to that which carries the roller is pushed upward by a spring 413, the amount of movement given by the spring being determined by a stop screw 414, these devices enabling the position of the arm with relation to the die to be accurately adjusted.

The slide may be reciprocated by any suitable mechanism. As shown, it is connected by a link 415 to a lever 416 pivoted at 417 to a bracket extending from the machine frame. The lever is connected by means of a link 418 to a crank arm 419 mounted on a stud 420. The hub of the arm 419 has a gear 421 fast thereto, this gear being driven at proper times by an interrupted gear 422 fast on the shaft 303 before referred to. This shaft 303 has on its inner end (see Figs. 2 and 4) a bevel gear 423 which is in mesh with a bevel gear 424 on the shaft 314 before referred to. This shaft 314 is provided with a worm gear 314$^a$ (see dotted lines in Fig. 4) which meshes with a worm 314$^b$ on the main driving shaft 259. It may be here remarked that this shaft 314, which is the shaft which drives the shaft 23 before referred to, is the shaft which operates the cams for operating the feeding devices. The driving of the shaft 23 is effected by means of a bevel gear 425 on the shaft 314 which is in mesh with a similar gear 422 on the shaft 23. The interrupted gear 422 is so timed as to cause a reciprocation of the roller 409 at proper times across the knife to cut a wrapper from a leaf which has been laid thereon by the operator.

When the cutting mechanism, when one is employed, is of such a character that the wrapper support is positioned in the interior of the die during the cutting operation, it is necessary that the movements of the wrapper supports be of such a character as to properly effect this positioning. In the best constructions, this will be effected by giving each wrapper support a movement at an angle to the plane of its wrapper delivery movement. As shown, the wrapper support is moved vertically upward into its position in the interior of the die. The means by which the wrapper supports are given the movement referred to may be of any suitable character. In the particular machine illustrated, the sleeves 350, 351 have secured to them by bolts or in any other suitable manner grooved blocks 427, the grooves in these blocks being marked 428. These grooved blocks are engaged at proper times by a projection 429 mounted on a lifter rod 430, this rod moving in suitable guides on the frame of the machine. The projection 429 is so positioned that as each support moves around the hollow standard, its groove 428 will come into engagement with the projection 429. At this time, the cam 381 acts on a roller 377' carried on the pivoted latch 376 and throws the latch out of engagement with the notch in the projection 378 or 379, as the case may be.

The lifter 430 is, in the particular construction shown, operated by a bell-crank lever 431, 432, (see Fig. 1) the arm 432 of this lever carrying a cam roll which works in a cam groove 433 formed in the face of a disk on which the teeth of the interrupted gear 422 are formed.

In order to prevent any displacement of either wrapper support during the lifting operation, a lock which holds each support carrying arm securely in position while the lifter is operated, will be preferably provided. Any suitable form of lock may be employed for this purpose. In the particular construction shown, there is provided an arm 434 having beveled faces, one of which is clearly shown at 435 in Fig. 26. This arm coöperates with a pair of rollers 435' mounted on the arms 352 and 354 and is carried on a short shaft 436 (see Figs. 4 and 26) which is suitably journaled in the frame of the machine. This shaft 436 is provided with a pinion 437 which is engaged by a rack 438 on a vertically moving rack bar 439 which moves in suitable guides in the machine frame. This rack bar is operated by a bell-crank lever 440 (see Fig. 1) which is operated from a cam groove 441 in the face of the disk which carries the interrupted gear 422.

It will be understood that the cam groove 433 will be so timed that after the lifter has operated to position a wrapper support in the interior space inclosed by the die, there will be a dwell in the movement of the lifter sufficiently long to enable the cutting roller to reciprocate across the face of the die and cut the wrapper. The cam then, through the connections described, draws the wrapper support down, carrying the wrapper. The wrapper support carrying the wrapper is now free to move, but the notch in the projection of its hub is not in position to be engaged by any of the pivoted latches 376. The other wrapper support is, however, being moved by the connections before described for the reason that a dog 376 is in engagement with its notch. As the other wrapper support swings around in its movement, however, the projection 378 or 379, as the case may be, strikes the other projection and moves the support carrying the wrapper forward and out from under the die. The two supports are now moving together and at this time the notch on the projection of the support which is carrying the wrapper comes into register with one of the dogs 376 on one of the arms 375. This arm, as has been explained, is fast to the hub and is, therefore, moving with the wrapper supports. When the roller 377' on this latch or dog passes out from under the cam 381 the spring pin which operates the dog is free to act and throws the dog into the notch, so that the movement of the support carrying the wrapper is now carried on by the connections from the worm 383 before referred to. The support which is carrying the wrapper is, therefore, advanced and the other support comes into position beneath the die, after which it is unlocked from the worm in the manner described, and the lifter operates to position it in the interior space inclosed by the die.

In order that the wrapper may be properly wrapped upon the bunch, it is necessary that it be presented thereto at a proper angle which angle will of course vary according to the particular shape of the bunch to be wrapped and the cigar to be produced. The particular machine illustrated effects the proper presentation of the wrapper to the bunch by a movement which is the resultant of three movements, namely, a movement by which the wrapper is advanced to the bunch, which may be termed an "approaching movement," a movement by which the angle of the wrapper with respect to the bunch is varied as the wrapping proceeds which may be termed an "angular" movement, and a movement by which the wrapper as it is presented is advanced along the bunch, which may be termed a "traversing" movement. These movements may be obtained in machines embodying the invention by giving either the wrapping mechanism or the wrapper support or both the movements referred to. In the particular machine illustrated, the traversing movement is effected by moving the wrapping mechanism, this being the movement referred to as being produced by the cam 313, the lever 310 and the link 309 (see Fig. 3), which movement causes the wrapping mechanism to move across the path of movement of the wrapper presenting device. The approaching movement, in the particular machine illustrated, is produced by the travel of the supports about the central standard. The angular movement in the particular machine illustrated, is effected by giving the wrapper supports an axial movement as they travel around the central standard.

It has been heretofore pointed out that the supports are mounted on sleeves 350, 351. Each of the blocks 427 before described as located at the lower ends of these sleeves carries an arm 442, provided with a roller which works in a cam groove 443 (see Figs. 4 and 27 to 29) formed in a plate 444 mounted on the table 382 before referred to. In the particular machine described, which machine is designed for wrapping a perfecto cigar which has a strongly tapered tuck end, it is necessary to bring the wrapper support into a position so that the wrapper is presented to the bunch at an acute angle to the axis of the bunch. After the tuck end of the wrapper has been wound about the bunch, the angular position of the wrapper is again changed, the wrapper being delivered to the central part of the bunch at a much greater angle. While these movements might be effected in various ways, the constructions differing with the variations in the shape of the cigar, in the particular machine described, there is provided (see Figs. 27-29) a swinging block 445 which has a groove 446 therein, this block being, by suitable mechanism, swung into position at the proper time so as to register with the cam groove 443 before referred to. As the roller on the arm 442 enters the groove 446, the block is swung from the position shown in Fig. 27 to the position shown in Fig. 28, this bringing the wrapper support into the proper position to deliver the wrapper properly to the tuck end of the bunch. As soon as the wrapper is wrapped about the tuck end of the bunch, the block 445 is swung in a reverse direction into the position shown in Fig. 29, at which time the groove 446 is again in register with the groove 443. At the time when this block is given the swinging movements referred to, the rotation of the hubs which carry the arms 352, 354, which arms carry the supports, is slowed down by a sliding movement of the worm 383 which has been before described, this slowing down of the rotation of the hubs and arms giving the block time to perform its swinging movements. As the roller on the arm 442 leaves the groove 446 in the block and passes again into the groove 443, the rotating movement produced by the worm is resumed, the further changes in the angular position of the support being effected by the groove 443. The diagrams, Figs. 27 to 29, inclusive, clearly illustrate the movements referred to.

The mechanism for operating the block 445 when this block is employed, may be of any suitable character. In the particular machine illustrated (see Fig. 4), the block is mounted on a vertical pivot 447, to which pivot is secured a sector 448 (see dotted lines in Fig. 4), this sector engaging with a sector 449 pivoted at 450 to a post 451 rising from the bed plate of the machine (see Fig. 24) This sector (see Fig. 4) is connected by a rod 452 with one of the arms 453 of a bell-crank lever 453, 454, the arm 454 carrying a roller which engages with a groove 455 of a cam mounted on the shaft 314.

When, as in the particular machine illustrated, the wrapper support moves under the wrapping mechanism to deliver its wrapper, means will be provided for positively transferring the tuck end of the wrapper to the wrapping mechanism. While this might be accomplished in various ways, as, for instance, by a blast mechanism similar to that described in Patent No. 654,203, granted to R. L. Patterson and George Arents, Jr., as assignees of Oluf Tyberg, dated July 24, 1900, in the construction illustrated, this is accomplished by means of a wrapper transferring finger which engages the wrapper while it is on the wrapper support, positively lifts it to the tuck end of the bunch and holds it there while the first wrap is made about the bunch. In the construction shown, this wrapper transferring finger is illustrated in Fig. 21 and marked 456. This finger is mounted on one of the arms 457 of a bell-crank 457—458, the arm 458 being connected by a rod 459 to an arm 460 on a short shaft 461 journaled in the frame which carries the wrapping mechanism. This shaft is provided with an arm 462 carrying a roller which runs on the periphery of a cam 463 mounted on the shaft 338 before referred to. This cam and these levers give the finger the movement necessary to bring it into engagement with the wrapper on the support and the movement necessary to draw it out from between the wrapper and the bunch after the wrapper has been wrapped about the bunch. To effect the lifting movement of the finger, there is provided a loop 464 carried on a rod 465, this rod passing through a suitable guide 466 on the frame of the wrapping mechanism and being connected at its upper end to a lever 467, this lever being fulcrumed at 468 in the frame of the wrapping mechanism and its other end carrying a bowl 469 which runs on the periphery of a cam 470 fast on the shaft 338 before referred to. The rod 465 works through a spring 471 the purpose of which is to cause the roller 469 to follow the contour of the cam 470. In order to enable the lever to get underneath the wrapper, the wrapper support is provided with a notch, this being conveniently done by inserting into the chamber of the support a notched block 472 (see Fig. 22). This wrapper transferring finger is not herein claimed, the same being described and claimed in a patent to Herrington and Knight, No. 808,745, January 2, 1906.

It is necessary in order to smoothly wind the wrapper upon the cigar bunch that a proper tension be kept upon it during the wrapping operation. It has been heretofore stated that the suction is constantly acting in the wrapper support during the wrapping operation, but further means are preferably provided to prevent the wrapper from pulling away from the support unevenly. A wrapper controller is provided for this purpose. This wrapper controller may be variously constructed. In the particular construction shown (see Figs. 22, 23) this controller is in the form of a roller 473 journaled on a rod 474 carried in a bracket 475. This bracket 475 is pivoted on a yoke 476 which is in turn pivoted on lugs 477 fast to the frame of the wrapping mechanism. This guide and tension roller is given movements toward and away from the wrapping mechanism, and it is also given movements by which it is carried into and out of engagement with the wrapper on the wrapper support. In order to move the roller toward and from the wrapping mechanism, the yoke 476 is provided with a stud 478 which carries a roller which runs on the face of a cam disk 479 mounted on the shaft 338 before referred to. The yoke 476 is held so that the roller will bear against the cam by a spring plunger 476$^a$ which bears against a lug 476$^b$ on the yoke. The movements of the roller by which it is carried into and out of engagement with the wrapper on the support is effected by securing a link 480 to the rear of the bracket 475, the connection being located behind the pivotal point of this bracket. This link 480 is connected to the arm 481 of a bell-crank 481—482, the arm 482 of this bell-crank carrying a roller 483 which runs on a cam formed on the disk 479 before referred to. A spring 434 is provided to insure the proper bearing of the roller on the wrapper.

As the wrapper support swings under the wrapping mechanism to vary the angular presentation of the wrapper to the wrapping mechanism, there is danger that, if the wrapper moves under the controller, there will be a side draft on the wrapper which will cause it to leave the support unevenly, and which is liable to tear the wrapper. To obviate this objection, the controller, in the best constructions, will be made movable to relieve this side draft. In the particular construction shown, the rod 474 is surrounded by a spring 485, this spring being located between the roller and the rod and bearing at one end against a shoulder formed on the rod, and at the other end against a shoulder formed on the roller. As the support swings, this allows the roller to travel on the supporting rod, thus relieving the side draft referred to.

The power for driving the wrapping mechanism may be obtained from any suitable source. As shown (see Figs. 2 and 30) it is driven by the chain 257 which drives the manipulating mechanism, this chain running over a sprocket 486 which is mounted on a short shaft 487, this shaft being provided with a gear 488 which meshes with a gear 489 on the shaft 303 before referred to.

After the bunch has been wrapped, it will, in the best constructions, be subjected to the operation of certain finishing devices which are embodied in the machine. The transferring means which are employed, when the finishing devices are embodied in the machine, to carry the cigar from the wrapping mechanism to the finishing devices may be widely varied in construction. In the particular machine shown (see Figs. 3 and 30) there is provided an arm 490 pivoted at 491 to a bracket extending from the machine frame, this arm being provided with suitable devices for holding the cigar. The arm is given the required movements by a connecting rod 492, this rod being secured to one of the arms 493 of a bell-crank lever 493—494 mounted on the pivot 299 before referred to. The arm 494 of this lever has a roller which engages a groove in a cam disk 495 mounted on the shaft 303 (see Figs. 4, 30 and 32). The arm will be provided with suitable holding devices for retaining the cigar thereon. These holding devices may be of any suitable description. As shown, (see Figs. 30, 36 to 38) the arm is provided with a pair of stationary gripper jaws 496 and a pair of pivoted jaws 497 which coöperate therewith. The pivoted jaws are mounted on a shaft 498 journaled in projections from the stationary jaws. The grippers are normally held closed by a spring 499 connected to an arm 500 fast on the shaft 498 before referred to, this spring being connected to a projection 501 on the lower part of the stationary gripper jaw. The jaws may be opened in any suitable manner. As shown, there is pivoted on the side of the arm a lever 502, this lever having a forked end which engages a stud 503 on an arm 504 projecting from the shaft 498 before referred to. This arm carries on the end opposite the fork a roller 505, and when the arm is swung into position beneath the wrapping mechanism so that the wrapped cigar may drop from the wrapping mechanism into the grippers, this roll 505 strikes a projection 506 on an arm 507 rising from the frame of the shaping mechanism, thus opening the grippers to receive the cigar. As the arm moves forward toward the finishing devices hereinafter described, the roll 505 passes out from under the projection 506 and the spring 499 closes the grippers on the cigar.

The finishing devices may be varied in construction and the operations performed may vary. In the particular machine shown, these finishing devices include a smoothing device which operates to polish the head or tip of the cigar. The particular construction of this smoothing device may be varied within wide limits. As shown, the smoothing device includes a cup shaped member 508 which is mounted on a stem 509 projecting into the end of a shaft 510 (see Fig. 34). This shaft (see Fig. 32) is mounted in a bracket 511 extending upward from the frame. Means are provided, in the particular machine shown, for producing a relative movement between the cigar transferring device and the smoothing device, when the cigar is opposite the smoothing device so as to bring the head of the cigar into the range of action of said device. While these means may be varied, in the particular construction shown, the shaft 510 has an endwise movement in its bearing to bring the cup shaped member into engagement with the cigar. This endwise movement, in the particular machine shown, is produced by an arm 512 (see Fig. 32) fast on a short shaft 513 mounted in the bracket 511. This shaft 513 has an arm 514 extending therefrom, this arm having secured to it a connecting rod 515, the other end of which is secured to an arm 516 extending from a hub 517 (see Fig. 30) pivoted on a stud extending from the frame of the machine. This hub has an arm 518 extending therefrom provided with a roller which engages a cam groove 519 in the periphery of the cam disk 302 before referred to. The shaft 510 may be driven in any suitable manner. As shown, it is provided with a pulley 520 splined to the shaft so as to permit the endwise movement referred to, this pulley being driven from a belt 521 running over a pulley 522 mounted on the power-shaft 259 before referred to.

Coöperating with the cup-shaped ironing member before referred to, there will preferably be provided a wrapper stretching member. In the particular construction shown, this wrapper stretching member consists of a brush 523 mounted on a short shaft 524 journaled in a hanger 525 which is secured to a collar 526 which is in turn secured to the shaft 510 in any suitable manner, as by a set screw 527. (See Fig. 34.) This brush is given a rotating movement with the ironing member around the cigar, and is also given a rotating movement on its own axis. In the particular construction shown, this is effected by providing a gear 528 which is mounted on the shaft 510 and which is stationary with respect thereto, the gear being locked against rotation by a pin 529 which extends through the gear, this pin projecting from the bracket 511 before referred to. The gear 528 is in mesh with an intermediate 530 journaled on a pin 531 which extends from the hanger 525. This intermediate 530 is in mesh with a gear 532 on the shaft 524 of the brush. The cup-shaped member is cut out, as shown, and the brush operates through the opening in the member. As the member rotates, therefore, it operates to smooth and polish the cigar and at the same time the brush lays the cigar wrapper smoothly on the bunch, the wrapper being ironed down by the cup-shaped member.

It will usually be found necessary to trim the tuck end of the cigar, especially where high grade cigars are being made. This may be done at any convenient time by any convenient mechanism. In the particular machine shown, this trimming of the tuck end of the bunch is effected by a rotating knife 533. (See Figs. 30 to 33.) This knife is so located as to act upon the tuck end of the cigar at the same time that the smoothing device is operating on its tip or head. In the construction shown, this knife is mounted on a shaft 534, this shaft being journaled in a bracket 535 extending from the machine frame. The knife may be driven in any suitable manner. As shown, the shaft 534 is provided with a gear 536, this gear being in mesh with a gear 537 mounted on a stud 538 supported on the bracket 535. This stud also supports a sprocket 539, the hub of which is fast to the gear 537 before referred to. This sprocket is driven by a chain 540 running over a sprocket wheel 541 mounted on the power shaft 259 before referred to.

The finishing devices, in the particular machine shown, further include a mechanism for re-rolling the cigar. In wrapping cigars by hand, the operator, after the cigar is wrapped, usually rolls it several times over the rolling table, pressing upon it with the palm of his hand. The effect of this operation is to loosen and even up the filler so that the filler may at all points fully expand in the wrapper. In the particular machine illustrated, the finishing devices include a device for performing a similar re-rolling operation. While the construction by which this re-rolling operation is effected may be widely varied, in the construction shown there is provided a tapered roll 542, the taper of this roll corresponding generally with the taper of the cigar from its tip toward the shoulder, at which point it begins to taper in the opposite direction to form the tuck end. Coöperating with this roll is a plate 543, this plate being curved and tapered to correspond generally to the curve and taper of the roll. This plate is mounted on a rock shaft 544 journaled in bearings in a bracket 545. Extending from the rock shaft 544 is an arm 546 to which is connected a spring 547 which operates to force the plate toward the roll. The distance the plate can move toward the roll is determined by means of a limiting stop 548 mounted on the bracket 545 before referred to. The roll 542 is mounted on a shaft 549 journaled in the bracket 545, and in the best constructions, the roll will be given oscillating movements which vary in extent. In other words, after the cigar has been placed between the plate and the roll, the roll is oscillated forward and back, but the extent of the oscillating movements in one direction, or certain of them, is greater than the extent in the opposite direction, so as to advance the cigar between the re-rolling members. This movement of the roll may be effected in any desired manner. As shown, the shaft 549 is connected by a universal joint 550 (see Fig. 31) to a short shaft 551 journaled in a bracket 552 extending from the machine. This shaft 551 is provided with a gear 553 which is operated by a sector 554 (see Figs. 32, 33) formed on one of the arms of a bell-crank lever pivoted at 555, the other arm of this lever engaging a suitably formed cam-groove 556 in the side of a cam disk 557 mounted on the shaft 303. The cigar may be presented to the re-rolling mechanism in any desired manner. In the particular construction shown, the transferring arm 490, after the cigar has been subjected to the action of the smoothing and trimming mechanism, delivers the cigar to a pair of star wheels 558, the movable jaw 497 being opened for this purpose, by contact of the arm 505 with a projection 559 mounted on the frame of the machine and located just beyond and below the cutting and smoothing mechanism. These star wheels 558 are mounted on a shaft 560 which is given a rotating step by step movement in any desired manner. In the construction shown, this is effected by a form of the well-known Geneva movement embodying a toothed wheel 561 mounted on the shaft 560 and a wheel 562 having a single tooth. When this tooth engages the wheel 561, the shaft 560 is rotated, but as the tooth passes out of engagement with the wheel the circumference of the wheel 562 engages the concave face of one of the broad teeth of the wheel 561, thus locking the wheel against movement until the tooth again engages it. This wheel 562 is mounted on a stud 563 projecting from the frame and fast to this wheel 562 is a gear 564 in mesh with a gear 565 mounted on a stud 566. This stud also supports a sprocket wheel 567 which is fast to the gear 565, this sprocket wheel being driven by a chain 568 running over a sprocket 569 on the shaft 303.

The completed cigar may be discharged from the re-rolling mechanism into any suitable receptacle.

The operation of the machine will be fully understood from the preceding description, and a further detailed statement of it is unnecessary.

Changes and variations may be made in the construction by which the invention is carried into effect, and it is to be further understood that certain features of the invention may be used independently of the other features. The invention is not, therefore, to be restricted to the particular mechanism hereinbefore described and illustrated in the accompanying drawings.

What is claimed is:—

1. In a cigar machine, the combination with a bunch forming mechanism, of a source of long filler supply, means for separating and delivering sections of long filler to the bunch forming mechanism, a wrapping mechanism, means for automatically forming and supplying wrappers to the wrapping mechanism, and means for transferring bunches from the bunch forming mechanism to the wrapping mechanism.

2. In a cigar machine, the combination with bunch forming mechanism, of a source of long filler supply, means for separating and delivering sections of long filler to the bunch forming mechanism, means for supplying binders to the bunch forming mechanism, a wrapping mechanism, and means for transferring bunches from the bunch forming mechanism to the wrapping mechanism.

3. In a cigar machine, the combination with bunch forming mechanism, of a source of long filler supply, means for separating and delivering sections of long filler to the bunch forming mechanism, means for supplying binders to the bunch forming mechanism, a wrapping mechanism, means for supplying wrappers to the wrapping mechanism, and means for transferring bunches from the bunch forming mechanism to the wrapping mechanism.

4. In a cigar machine, the combination with a bunch forming mechanism, of means for supplying filler material thereto, means for supporting a plurality of binders in the machine and successively presenting them to the bunch forming mechanism, a wrapping mechanism, means for transferring bunches from the bunch forming mechanism to the wrapping mechanism, and means for supplying wrappers to the wrapping mechanism.

5. In a cigar machine, the combination with a bunch forming mechanism, of means for supplying filler material thereto, means for supporting a plurality of binders in the machine and for successively presenting them to the bunch forming mechanism, a wrapping mechanism, means for transferring the bunch from the bunch forming mechanism to the wrapping mechanism, and means for forming and supplying wrappers to the wrapping mechanism.

6. In a cigar machine, the combination with a bunch forming mechanism, of a source of long filler supply, means for separating and delivering sections of long filler to the bunch forming mechanism, means for supplying binders to the bunch forming mechanism, a wrapping mechanism, means for transferring bunches from the bunch forming mechanism to the wrapping mechanism, and means for forming and supplying wrappers to the wrapping mechanism.

7. In a cigar machine, the combination with a bunch forming mechanism, of a source of long filler supply, means for separating and delivering sections of long filler to the bunch forming mechanism, means for supporting a plurality of binders in the machine and successively presenting them to the bunch forming mechanism, a wrapping mechanism, means for transferring the bunches from the bunch forming mechanism to the wrapping mechanism, and means for supplying wrappers to the wrapping mechanism.

8. In a cigar machine, the combination with a bunch forming mechanism, of a source of long filler supply, means for separating and delivering sections of long filler to the bunch forming mechanism, means for supporting a plurality of binders in the machine and successively presenting them to the bunch forming mechanism, a wrapping mechanism, means for transferring bunches from the bunch forming mechanism to the wrapping mechanism, and means for forming and supplying wrappers to the wrapping mechanism.

9. In a cigar machine, the combination with a bunch forming mechanism, of means for supporting a plurality of binders in the machine and successively presenting them to the bunch forming mechanism, means for supplying filler material to the bunch forming mechanism, a wrapping mechanism, and means for transferring bunches from the bunch forming mechanism to the wrapping mechanism.

10. In a cigar machine, the combination with a bunch forming mechanism, of a wrapping mechanism, cigar finishing devices, and means whereby the bunch after it is formed in the bunch forming mechanism is successively presented to the wrapping mechanism and finishing devices.

11. In a cigar machine, the combination with a bunch forming mechanism, of means for supplying filler material and binders thereto, a wrapping mechanism, means for transferring the bunches from the bunch forming mechanism to the wrapping mechanism, means for supplying wrappers to the wrapping mechanism, and finishing means including a re-rolling mechanism operating on the cigar after it is removed from the wrapping mechanism.

12. In a cigar machine, the combination with a bunch forming mechanism, of means for supplying filler material and binders thereto, a wrapping mechanism, means for transferring the bunches from the bunch forming mechanism to the wrapping mechanism, means for supplying wrappers to the wrapping mechanism, and finishing means including head smoothing devices and re-rolling mechanism operating on the cigar after it is removed from the wrapping mechanism.

13. In a cigar machine, the combination with a bunch forming mechanism, of means for supplying filler material and binders thereto, a wrapping mechanism, means for transferring bunches from the bunch forming mechanism to the wrapping mechanism, means for forming and supplying wrappers to the wrapping mechanism, and finishing means including a re-rolling mechanism operating on the cigar after it is removed from the wrapping mechanism.

14. In a cigar machine, the combination with a bunch forming mechanism, of means for supplying filler material and binders thereto, a wrapping mechanism, means for transferring bunches from the bunch forming mechanism to the wrapping mechanism, means for forming and supplying wrappers to the wrapping mechanism, and finishing means including head smoothing devices and re-rolling mechanism operating on the cigar after it is removed from the wrapping mechanism.

15. In a cigar machine, the combination with a bunch forming mechanism, of means for supplying proper charges of long filler thereto, binder supplying means, a wrapping mechanism, means for transferring bunches from the bunch forming mechanism to the wrapping mechanism, means for forming and supplying wrappers to the wrapping mechanism, and finishing means operating on the cigar after it is removed from the wrapping mechanism.

16. In a cigar machine, the combination with a bunch forming mechanism, of means for supplying proper charges of long filler thereto, binder supplying means, a wrapping mechanism, means for transferring bunches from the bunch forming mechanism to the wrapping mechanism, means for forming and supplying wrappers to the wrapping mechanism, and finishing means including a re-rolling mechanism for operating on the cigar after it is removed from the wrapping mechanism.

17. In a cigar machine, the combination with a bunch forming mechanism, means for supplying proper charges of long filler thereto, binder supplying means, a wrapping mechanism, means for transferring bunches from the bunch forming mechanism to the wrapping mechanism, means for forming and supplying wrappers to the wrapping mechanism, and finishing means including head smoothing devices and a re-rolling mechanism for operating on the cigar after it is removed from the wrapping mechanism.

18. The combination with a channel, of a feeding device working therein, mechanism for giving the feeding device a forward movement, said mechanism being constructed to cause the feeding device to produce only a limited pressure on the material, mechanism for causing the feeding device to be disengaged from and again engaged with the material, and means for interrupting the action of the forwarding mechanism with respect to the feeding device before the disengaging mechanism acts.

19. The combination with a feeding channel, of a feeding device working therein, mechanism including a weight for giving the feeding device a forwarding movement, and means for causing the feeding device to be engaged with and disengaged from the material in the channel.

20. The combination with a feeding channel, of a feeding device working therein, mechanism including a weight for giving the feeding device a forwarding movement, means for causing the feeding device to be engaged with and disengaged from the material in the channel, and means for interrupting the action of the weight with respect to the feeding device before the disengaging mechanism acts.

21. The combination with a feeding channel, of pivoted feeding fingers operating therein, mechanism for giving the feeding fingers a forwarding movement, said mechanism being constructed to cause the fingers to produce only a limited pressure on the material, mechanism for causing the fingers to be engaged with and disengaged from the material in the channel, and means for interrupting the action of the feeding fingers before the disengaging mechanism acts.

22. The combination with a feeding channel, of pivoted feeding fingers operating therein, mechanism including a weight for giving the feeding fingers a forwarding movement, and mechanism for causing the fingers to be engaged with and disengaged from the material in the channel.

23. The combination with a feeding channel, of a set of pivoted feeding fingers working therein, mechanism including a weight for giving the feeding fingers a forwarding movement, mechanism for causing the fingers to be engaged with and disengaged from the material in the channel, and means for interrupting the action of the weight on the fingers before the disengaging mechanism operates.

24. The combination with a feeding channel, of a feeding device operating to feed the tobacco along the channel, means whereby the feeding action of said device is limited when there is more than a predetermined amount of tobacco in the channel, means for forwarding the tobacco into the range of action of the feeding device, and means for varying the movement of the forwarding means in accordance with the varying action of the feeding device, whereby the amount of tobacco forwarded to the feeding device varies with the action of the feeding device.

25. The combination with a feeding channel, of a charge carrier, a feeding device operating to feed tobacco along the channel into the charge carrier, means whereby the feeding action of said device is limited when there is more than a predetermined amount of tobacco in the channel, means for forwarding the tobacco into the range of action of the feeding device, and means for varying the movement of the forwarding means in accordance with the varying action of the feeding device, whereby the amount of tobacco forwarded to the feeding device varies with the action of the feeding device.

26. The combination with a feeding channel, of a feeding device operating to feed the tobacco along the channel, means whereby the feeding action of said device is limited when there is more than a predetermined amount of tobacco in the channel, means for forwarding the tobacco into the range of action of the feeding device, operating mechanism for said forwarding means, and means whereby the action of the operating mechanism on the forwarding means is varied in accordance with the feeding action of the feeding device, whereby the amount of tobacco advanced by the forwarding means varies in accordance with the action of the feeding device.

27. The combination with a feeding channel, of a charge carrier, a feeding device operating to feed the tobacco along the channel, mechanism for operating said feeding device, said mechanism being constructed to cause the device to produce only a limited pressure on the tobacco whereby only a limited amount of tobacco is fed into the charge carrier, means for forwarding the tobacco into the range of action of the feeding device, operating mechanism therefor, and connections between said operating mechanism and the operating mechanism for the feeding device whereby the action of the forwarding means is varied in accordance with the amount of tobacco advanced by the feeding device.

28. The combination with a feeding channel, of a charge carrier, feeding fingers operating in the channel, means whereby the stroke of the fingers is limited when there is more than a predetermined amount of tobacco in the channel, means for forwarding the tobacco into the range of action of the feeding fingers, operating mechanism for said forwarding means, and means whereby the movement of the forwarding means is varied in accordance with the varying stroke of the feeding fingers.

29. The combination with a feeding channel, of a charge carrier, feeding fingers operating to feed the tobacco into the charge carrier, means whereby the stroke of the fingers is limited when there is more than a predetermined amount of tobacco in the channel, a carrier for forwarding the tobacco into the range of action of the feeding fingers, and means for varying the feeding action of the carrier in accordance with the varying feeding action of the feeding fingers.

30. The combination with a feeding channel, of a charge carrier, feeding fingers operating to feed the tobacco into the charge carrier, a weight, suitable connections for producing a feeding movement of the fingers, a carrier for forwarding the tobacco into the range of action of the fingers, means for giving the carrier intermittent movements, and connections whereby a variation in the movement of the feeding fingers produces a variation in the movement of the carrier.

31. The combination with a feeding channel, of feeding fingers operating to feed the tobacco along the channel, a weight, and suitable connections for operating the fingers, a carrier for forwarding the tobacco into the range of action of the fingers, means including a pawl and ratchet mechanism for operating the carrier, and means whereby the amount of movement produced by the pawl and ratchet mechanism is varied in accordance with the movement of the fingers operated by the weight.

32. The combination with a feeding channel, of a rolling mechanism, a charge carrier, means for moving the charge carrier from a receiving position in register with the feeding channel to a delivery position with respect to the rolling mechanism, a cover, and means whereby the cover is locked to and moves with the carrier between the receiving and delivery positions and is unlocked from the carrier prior to the time the carrier moves into these positions.

33. The combination with a feeding channel, of a rolling mechanism, a charge carrier, means for rotating the charge carrier between the rolling mechanism and the feeding channel, a cover, latching devices for locking the cover to the carrier as the carrier moves between the feeding channel and the rolling mechanism, and means for releasing the latching devices prior to the time when the carrier reaches its receiving and delivery positions.

34. The combination with a rolling mechanism, of a binder carrier comprising a plurality of binder supports, means for operating the carrier to successively bring the supports into delivery position, clamps for retaining the binders on the supports, and means for transferring the binders from the supports to the rolling mechanism.

35. The combination with a rolling mechanism, of a binder carrier constructed to support a plurality of binders, means for seizing the edge of each binder and transferring it to the rolling mechanism, and means for operating the carrier to bring the binders successively within the range of action of the seizing and transferring means.

36. The combination with a rolling mechanism, of a carrier comprising a plurality of binder supports, means for operating the carrier to successively bring the supports into delivery position, and means for seizing the edge of each binder and transferring it to the rolling mechanism.

37. The combination with a rolling mechanism, of a binder carrier constructed to support a plurality of binders, a reciprocating transferrer for seizing the edges of the binders and transferring them to the rolling mechanism, and means for operating the carrier to bring the binders successively within the range of action of the transferrer.

38. The combination with a rolling mechanism, of a carrier comprising a plurality of binder supports, means for operating the carrier to successively bring the supports into delivery position, and a reciprocating transferrer for seizing the edge of each binder and transferring it to the rolling mechanism.

39. The combination with a rolling mechanism, of a carrier constructed to support a plurality of binders, a transferring mechanism including a gripper for seizing the edges of the binders, and means for operating the carrier to bring the binders successively within the range of action of the transferring mechanism.

40. The combination with a rolling mechanism, of a binder support having a recessed edge, a clamp also having a recessed edge coöperating therewith, a transferrer having grippers working through a recess in the support, and means for operating the transferrer.

41. The combination with a rolling mechanism, of a plurality of supports each having a recessed edge, a plurality of clamps, one for each support, the clamps also having recessed edges, a transferrer having grippers each coöperating with the recessed edges, and means for successively bringing the supports into the range of action of the transferrer.

42. The combination with a rolling mechanism, of a plurality of binder supports mounted to rotate in a horizontal plane, a transferrer having edge grippers, and means whereby the transferrer is moved between the binder supports and the rolling mechanism.

43. The combination with a rolling mechanism, of a plurality of binder supports each comprising a recessed plate and a clamp, said supports being mounted to rotate in a horizontal plane, a transferrer having edge grippers, and means whereby the transferrer is moved between the binder supports and the rolling mechanism.

44. The combination with a bunch forming mechanism, of a group of manipulating rolls arranged to receive the bunch from the bunch forming mechanism.

45. In a cigar machine, the combination with a group of bunch manipulating rolls, of a wrapping mechanism arranged to receive a worked-up bunch from the manipulating rolls.

46. In an organized machine for making long filler cigars the combination with a bunch forming mechanism, of a wrapping mechanism, a bunch manipulator mechanism intermediate the bunch forming and wrapping mechanisms, and means for effecting the automatic operation of said mechanisms and for causing the bunches to be automatically presented in succession to the manipulator and wrapping mechanisms.

47. The combination with bunch forming mechanism, of a wrapping mechanism, a bunch manipulator comprising a plurality of rolls intermediate the bunch forming mechanism and the wrapping mechanism.

48. The combination with bunch forming mechanism, of a wrapping mechanism, a bunch manipulator comprising a plurality of rolls intermediate the bunch forming mechanism and the wrapping mechanism, and means for transferring the bunch from the manipulator to the wrapping mechanism.

49. The combination with a bunch forming mechanism, of a manipulating mechanism comprising a plurality of intergeared rolls arranged to receive the bunch from the bunch forming mechanism, a wrapping mechanism, and means for transferring the bunch from the manipulating mechanism to the wrapping mechanism.

50. The combination with a bunch forming mechanism, of a manipulator, a pendent wrapping mechanism arranged above the manipulator, and means for lifting the shaped bunch from the manipulator to the wrapping mechanism.

51. The combination with a bunch forming mechanism, of a group of driven rolls operating on the bunch after it has been formed, a wrapping mechanism arranged over the rolls, a plurality of pins, and means whereby the pins are operated to transfer the bunch from the rolls into the wrapping mechanism.

52. The combination with a bunch forming mechanism, of a group of rolls operating on the bunch after it has been formed, means whereby certain of the rolls are given movements to permit the bunch to be placed in and removed from the group, means for driving the rolls, and a wrapping mechanism.

53. The combination with a bunch forming mechanism, of a group of rolls operating on the bunch after it has been formed, means whereby certain of the rolls are given movements to permit the bunch to be placed in and removed from the group, means for driving the rolls, a wrapping mechanism, and means for transferring the bunch from the rolls to the wrapping mechanism.

54. The combination with a bunch forming mechanism, of a wrapping mechanism, a bunch manipulating mechanism intermediate the wrapping and forming mechanisms, mechanism for trimming the bunch while in the manipulating mechanism, means for automatically effecting the operation of said mechanisms and for causing the bunches to be presented in succession to the manipulating and wrapping mechanisms.

55. The combination with a bunch forming mechanism, of a wrapping mechanism, a bunch manipulating mechanism intermediate the forming and wrapping mechanism, mechanism for trimming the bunch while in the manipulating mechanism, and means for transferring the bunch from manipulating mechanism to the wrapping mechanism.

56. The combination with a bunch forming mechanism, of a group of rolls operating on the bunch after it has been formed, a wrapping mechanism, means for driving the rolls, a trimming mechanism operating on the bunch while in the rolls, and means for transferring the bunch to the wrapping mechanism.

57. The combination with a bunch forming mechanism, said mechanism including a rolling belt and table, a group of rolls located near the discharge end of said table operating on the bunch after it has been formed, a wrapping mechanism, and means for transferring the bunch from the rolls to the wrapping mechanism.

58. The combination with a bunch forming mechanism, said mechanism including a rolling belt and table, a group of rolls located near the discharge end of said table operating on the bunch after it has been formed, a wrapping mechanism, means for transferring the bunch from the rolls to the wrapping mechanism, and trimming mechanism for operating on the bunch while in the rolls.

59. In a cigar machine, the combination with a bunch forming mechanism, of a manipulating mechanism, a wrapping mechanism, finishing devices, and means for causing the bunch after leaving the bunch forming mechanism to be subjected successively to the action of said mechanism and devices.

60. In a cigar machine, the combination with a bunch forming mechanism, of a manipulating mechanism, a wrapping mechanism, head smoothing and trimming devices, a re-rolling mechanism, and means for causing the bunch after leaving the bunch forming mechanism to be successively subjected to the action of said mechanism and devices.

61. The combination with a wrapping mechanism having pendent wrapping members, of a wrapper support beneath the wrapping mechanism, means for producing relative movements between the wrapping mechanism and the support to cause the wrapper to be properly wound upon the bunch.

62. The combination with a wrapping mechanism having pendent wrapping members, of a wrapper support beneath the wrapping mechanism, and means for giving both the support and the wrapping mechanism movements to cause the wrapper to be properly wound upon the bunch.

63. The combination with a carriage, of a wrapping mechanism having pendent wrapping members mounted therein, means for reciprocating the carriage, a wrapper support beneath the wrapping mechanism, and means for giving the wrapper support movements which in connection with the movement of the carriage will cause the wrapper to be properly wound upon the bunch.

64. The combination with a wrapping mechanism having pendent wrapping members, of a suction wrapper support beneath the wrapping mechanism, means for producing relative movements between the wrapping mechanism and the support to cause the wrapper to be properly wound upon the bunch.

65. The combination with a wrapping mechanism having pendent wrapping members, of a suction wrapper support beneath the wrapping mechanism, and means for giving both the support and the wrapping mechanism movements to cause the wrapper to be properly wound upon the bunch.

66. The combination with a carriage, of a wrapping mechanism having pendent wrapping members mounted therein, means for reciprocating the carriage, a suction wrapper support beneath the wrapping mechanism, and means for giving the wrapper support movements which in connection with the movement of the carriage will cause the wrapper to be properly wound upon the bunch.

67. The combination with a die arranged about an interior space, of a wrapper support, means for positioning the support in the opening, coöperating cutting means, means for retaining the cut wrapper on the support, a wrapping mechanism having pendent wrapping members, and means for moving the wrapper support from its position in the die to a delivery position beneath the wrapping mechanism.

68. The combination with a wrapping mechanism, of a die inclosing an interior space, a coöperating cutting mechanism, a wrapper support, means for retaining the wrapper on the support, and means for giving the support vertical reciprocating movements to cause it to enter and recede from the die and a horizontal traveling movement to bring it into delivery position with respect to the wrapping mechanism.

69. The combination with a wrapping mechanism, of a die inclosing an interior space, a coöperating cutting mechanism, a suction wrapper support, means for retaining the wrapper on the support, and means for giving the support vertical reciprocating movements to cause it to enter and recede from the die and a horizontal traveling movement to bring it into delivery position with respect to the wrapping mechanism.

70. The combination with a wrapping mechanism, of a die arranged around an interior space, coöperating cutting mechanism, a suction wrapper support, and means for giving the support vertical reciprocating movements to cause it to enter and recede from the die and move into delivery position, and means for producing relative movements between the support and the wrapping mechanism to cause the wrapper to be properly wound upon the bunch in the wrapping mechanism.

71. The combination with a wrapping mechanism having pendent wrapping members, of a plurality of wrapper supports, means for bringing the supports successively into delivery position beneath the wrapping mechanism, and means for producing relative movements between the supports and the wrapping mechanism to cause the wrapper to be properly wound upon the bunch in said mechanism.

72. The combination with a wrapping mechanism having pendent wrapping members, of a plurality of wrapper supports, means for bringing the supports successively into delivery position beneath the wrapping mechanism, and means for producing between the supports and the wrapping mechanism relative movements to properly wind the wrapper on the bunch in the wrapping mechanism.

73. The combination with a wrapping mechanism having pendent wrapping members, of a die arranged around an interior space, coöperating cutting mechanism, a plurality of suction wrapper supports, and means for successively bringing the supports into position in the interior of the die and into delivery position with respect to the wrapping mechanism.

74. The combination with a wrapping mechanism having pendent wrapping members, of a die arranged to inclose an interior space, a coöperating cutting mechanism, a plurality of suction wrapper supports, and means for successively moving the supports into the interior of the die and then into delivery position beneath the wrapping mechanism.

75. The combination with a wrapping mechanism, of wrapper cutting devices, a driving mechanism, a plurality of wrapper supports, connections between the driving mechanism and the supports, and means for stopping the movement of each support while the cutting devices are acting without interfering with the movement of the other support.

76. The combination with a wrapping mechanism, of wrapper cutting devices, a driving mechanism, a plurality of suction wrapper supports, connections between the driving mechanism and the supports, and means for stopping the movement of each support while the cutting devices are acting without interfering with the movement of the other support.

77. The combination with a wrapping mechanism having pendent wrapping members, of a plurality of wrapper supports, a wrapper cutting mechanism, means for giving each support a movement to bring it into operative relation with the cutting mechanism, and means for giving each support a movement to cause it to present the wrapper to the wrapping mechanism and beneath the same.

78. The combination with a wrapping mechanism having pendent wrapping members, of a plurality of suction wrapper supports, a wrapper cutting mechanism, means for giving each support a movement to bring it into operative relation with the cutting mechanism, and means for giving each support a movement to cause it to present the wrapper to the wrapping mechanism and beneath the same.

79. The combination with a plurality of wrapper supports, of a driver for moving said supports in an orbital path, a wrapping mechanism, a cutting mechanism adjacent said path, means for giving each support a swinging movement independent of its orbital movement to deliver the wrapper to the wrapping mechanism, and means for interrupting the driving connections between each support and the driving mechanism while the cutting mechanism is operating.

80. The combination with a plurality of suction wrapper supports, of a driver for moving said supports in an orbital path, a wrapping mechanism, a cutting mechanism adjacent said path, means for giving each support a swinging movement independent of its orbital movement to deliver the wrapper to the wrapping mechanism, and means for interrupting the driving connections between each support and the driving mechanism while the cutting mechanism is operating.

81. The combination with a plurality of wrapper supports, of a driving mechanism for moving the supports in an orbital path, a wrapping mechanism located over the path of movement of the supports, and means for giving each support a swinging movement in addition to its orbital movement whereby it delivers the wrapper to the wrapping mechanism.

82. The combination with a plurality of wrapper supports, of a driving mechanism for moving the supports in an orbital path, a wrapping mechanism located over said path, a cutting mechanism, means for giving each wrapper support a swinging movement in addition to its orbital movement to cause it to deliver the wrapper to the wrapping mechanism, a cutting mechanism, and means for interrupting the driving connection between each support and the driving mechanism while the cutting mechanism is operating.

83. The combination with a plurality of suction wrapper supports, of a driving mechanism for moving the supports in an orbital path, a wrapping mechanism located over the path of movement of the supports, means for giving the wrapping mechanism a movement across the path of movement of the supports, and means for giving each support a swinging movement to enable it to deliver the wrapper to the wrapping mechanism.

84. The combination with a plurality of suction wrapper supports, of a driving mechanism for moving the supports in an orbital path, a wrapping mechanism located over said path, a cutting mechanism, means for giving each wrapper support a swinging movement in addition to its orbital movement to cause it to deliver the wrapper to the wrapping mechanism, means for giving the wrapping mechanism a movement across the path of movement of the supports, and means for interrupting the driving connection between each support and the driving mechanism while the cutting mechanism is operating.

85. The combination with a plurality of wrapper supports, of a driving mechanism for moving the supports in an orbital path, a wrapping mechanism located over the path, means for giving the wrapping mechanism a movement across the path of the supports, means for giving each support a swinging movement in addition to its orbital movement to enable it to deliver the wrapper to the wrapping mechanism, a cutting mechanism, means for giving each support a reciprocating movement at an angle to its orbital path to bring it within the range of action of the cutting devices, and means for interrupting the driving connections for each support while the cutting mechanism is operating.

86. The combination with a plurality of suction wrapper supports, of a driving mechanism for moving the supports in an orbital path, a wrapping mechanism located over the path, means for giving the wrapping mechanism a movement across the path of the supports, means for giving each support a swinging movement in addition to its orbital movement to enable it to deliver the wrapper to the wrapping mechanism, a cutting mechanism, means for giving each support a reciprocating movement at an angle to its orbital path to bring it within the range of action of the cutting mechanism, and means for interrupting the driving connections for each support while the cutting mechanism is operating.

87. The combination with a wrapping mechanism, of a wrapper support, means for giving the support a wrapper delivery movement whereby it is caused to deliver the wrapper beneath the wrapping mechanism, a cutting mechanism, and means for giving the support a movement at an angle to said wrapper delivery movement to bring it within the range of action of the cutting mechanism.

88. The combination with a plurality of suction wrapper supports, of means for causing them to move in an orbital path, a wrapping mechanism located over the path, means for moving the wrapping mechanism across said path, a cutting mechanism, means for interrupting the orbital movement of each support while the cutting mechanism is operating.

89. The combination with a plurality of suction wrapper supports, of means for causing them to move in an orbital path, a wrapping mechanism located over the path, means for giving the wrapping mechanism a movement across the path, and means for giving each support a swinging movement in addition to its orbital movement to enable it to deliver the wrapper to the wrapping mechanism.

90. The combination with a plurality of suction wrapper supports, of means for causing them to move in an orbital path, a wrapping mechanism located over the path, means for giving the wrapping mechanism a movement across the path, means for giving each support a swinging movement in addition to its orbital movement to enable it to deliver the wrapper to the wrapping mechanism, and a cutting mechanism.

91. The combination with a plurality of suction wrapper supports, of means for moving them in an orbital path, a wrapping mechanism located over the path, means for giving the wrapping mechanism a movement across said path, means for giving each support a swinging movement in addition to its orbital movement, a die having an interior space, coöperating cutting devices, means for moving each support into the interior of the die, and means for interrupting the orbital movement of each support while the cutting devices are operating.

92. The combination with a wrapping mechanism, of a wrapper support, means for holding the wrapper on the support in a stretched condition, means for producing relative movements of the support and the wrapping mechanism, whereby the wrapper is properly presented to the wrapping mechanism, said means including devices whereby the wrapper support is caused to vary its angular position with respect to the wrapping mechanism, a controller engaging the wrapper on the support, said controller having a movement as the support varies its angular position to relieve the side draft on the wrapper.

93. The combination with a wrapping mechanism, of a suction wrapper support, the wrapper being held thereon in a stretched condition, means for producing relative movements of the support and the wrapping mechanism, whereby the wrapper is properly presented to the wrapping mechanism, said means including devices whereby the wrapper support is caused to vary its angular position with respect to the wrapping mechanism, and a controller engaging the wrapper on the support, said controller having a movement as the support varies its angular position to relieve the side draft on the wrapper.

94. The combination with a wrapping mechanism, of a suction wrapper support on which the wrapper is held in a stretched condition, means for producing relative movements of the support and the wrapping mechanism to properly present the wrapper to the wrapping mechanism, said means including devices whereby the wrapper support is caused to vary its angular position with respect to the wrapping mechanism, and a controlling roll engaging the wrapper on the support, said roll being mounted to have a sidewise movement.

95. The combination with a wrapping mechanism, of a suction wrapper support on which the wrapper is held in a stretched condition, means for producing relative movements between the support and the wrapping mechanism to properly present the wrapper to the wrapping mechanism, said means including devices whereby the support is caused to vary its angular position with respect to the wrapping mechanism, and a controller mounted on the wrapping mechanism and engaging the wrapper on the support, said controller being movable to relieve the side draft on the wrapper.

96. The combination with a wrapping mechanism, of a suction wrapper support on which the wrapper is held in a stretched condition, means for producing relative movements between the support and the wrapping mechanism to properly present the wrapper to the wrapping mechanism, said means including devices whereby the support is caused to vary its angular position with respect to the wrapping mechanism, and a controller roll mounted on the wrapping mechanism and engaging the wrapper on the support, said roll being movable sidewise to relieve the side draft on the wrapper.

97. The combination with a wrapping mechanism, of means for supporting it with the wrapping members in a pendent position, a wrapper support, means for retaining the wrapper on the support, means for moving the wrapper support beneath the wrapping mechanism, and means for transferring the tuck end of the wrapper from the support to the wrapping mechanism.

98. The combination with a wrapping mechanism, of means for supporting it with the wrapping members in a pendent position, a suction wrapper support, means for producing relative movements to properly present the wrapper to the bunch in the wrapping mechanism, the support as the wrapper is delivered being beneath the wrapping mechanism, and means for transferring the tuck end of the wrapper from the support to the wrapping mechanism.

99. The combination with a wrapping mechanism, of a suction wrapper support, means for producing movements of the wrapping mechanism and the support whereby the wrapper is delivered to the wrapping mechanism, the support being caused to pass beneath the wrapping mechanism, and means for lifting and holding the tuck end of the wrapper against the bunch in the wrapping mechanism.

100. The combination with a wrapping mechanism having pendent wrapping members, of means for moving the bunch upward into the range of action of said members.

101. The combination with a wrapping mechanism having pendent wrapping members, of means for opening and closing the members, and means for lifting the bunch upward into the range of action of said members.

102. The combination with a wrapping mechanism having pendent wrapping members, of means for opening and closing the members, and pins for lifting the bunch upward into the range of action of said members.

103. The combination with a wrapping mechanism having pendent wrapping members, of means for opening and closing the members, means for moving the bunch upward into the range of action of the members, a cigar transferring device, and means for positioning it beneath the members so as to permit the wrapped cigar to drop thereinto when the members are opened.

104. The combination with a wrapping mechanism, of smoothing devices for operating on the head of the cigar, a transferrer, and means for operating the transferrer to carry the cigar from the wrapping mechanism into the range of action of the smoothing devices.

105. The combination with a wrapping mechanism, of a transferring arm having holding devices, smoothing devices, and means for moving the arm to bring the cigar into the range of action of the smoothing devices.

106. The combination with a wrapping mechanism, of smoothing devices for operating on the head of the cigar, a transferrer, means for operating the transferrer to carry the cigar from the wrapping mechanism into the range of action of the smoothing devices, and a trimming mechanism for operating on the tuck end of the cigar.

107. The combination with a wrapping mechanism, of a transferring arm having holding devices, smoothing devices, means for moving the arm to bring the cigar into the range of action of the smoothing devices, and a trimming mechanism for operating on the tuck end of the cigar.

108. The combination with a smoothing mechanism for cigar machines and for operating on a completely wrapped cigar comprising a wrapper stretching device and an ironing device, of means for producing a relative rotary movement between the completely wrapped cigar and the smoothing mechanism.

109. The combination with a smoothing mechanism for cigar machines comprising a wrapper stretching device and an ironing device, of means for rotating said smoothing mechanism around the cigar.

110. The combination with a smoothing device comprising a cup-shaped member and a brush operating in combination therewith, of means for producing a relative rotating movement between said smoothing device and the cigar.

111. The combination with a smoothing device comprising a cup-shaped member and a brush operating in combination therewith, of means for rotating said device around the cigar.

112. The combination with a smoothing device comprising a cup-shaped member having an opening therein, of a brush rotating in said opening, and means for producing a relative rotating movement between a cigar and said device.

113. The combination with a wrapping mechanism, of a cigar transferrer, a smoothing device comprising an ironing member and a wrapper laying member, means for operating the transferrer to bring the cigar within the range of action of the smoothing device, and means for rotating said device around the cigar.

114. The combination with a wrapping mechanism, of a cigar transferrer, a smoothing device comprising an ironing member and a brush acting in conjunction therewith, means for operating the transferrer to bring the cigar within the range of action of the smoothing device, and means for rotating said device around the cigar.

115. The combination with a wrapping mechanism, of a cigar transferrer, a smoothing device comprising a cup-shaped member having an opening therein and a brush acting in conjunction therewith, means for operating the transferrer to bring the cigar within the range of action of the smoothing device, and means for rotating said device around the cigar.

116. In a re-rolling device for cigar machines, the combination with a re-rolling roll, of a coöperating cigar support, and means for giving the re-rolling roll backward and forward movements varying in extent whereby the cigar is re-rolled and discharged.

117. In a re-rolling device for cigar machines, the combination with a tapered re-rolling roll, of a coöperating cigar support, and means for giving the re-rolling roll backward and forward movements varying in extent whereby the cigar is re-rolled and discharged.

118. In a re-rolling device for cigar machines, the combination with a tapered re-rolling roll, of a coöperating cigar support correspondingly curved and tapered, and means for giving the re-rolling roll backward and forward movements varying in extent whereby the cigar is re-rolled and discharged.

119. In a re-rolling mechanism for cigar machines, the combination with a roll, of a cigar supporting surface, and means for giving the roll backward and forward movements, the forward movements varying in extent, at least one of them being greater in extent than any backward movement.

120. In a re-rolling mechanism for cigar machines, the combination with a tapered re-rolling roll, of a cigar supporting surface, and means for giving the roll backward and forward movements, the forward movements varying in extent, at least one of them being greater in extent than any backward movement.

121. In a re-rolling mechanism for cigar machines, the combination with a tapered re-rolling roll, of a cigar supporting surface correspondingly curved and tapered, and means for giving the roll backward and forward movements, the forward movements varying in extent, at least one of them being greater in extent than any backward movement.

122. The combination with a wrapping mechanism, of head smoothing and re-rolling mechanisms, and means for causing the cigar to be subjected to the action of said mechanisms.

123. The combination with a wrapping mechanism, of head smoothing, trimming and re-rolling mechanisms, and means for causing the cigar to be subjected to the action of said mechanisms.

124. The combination with a wrapping mechanism, of head smoothing, trimming and re-rolling mechanisms, and suitable forwarding devices operating to present the cigar to said mechanisms.

In testimony whereof, I have hereunto set my hand, in the presence of two subscribing witnesses.

OLUF TYBERG.

Witnesses:
PERCY LEONARD
F. M. HAZLETON.